United States Patent [19]

Compton et al.

[11] Patent Number: 5,018,352
[45] Date of Patent: * May 28, 1991

[54] MODULAR PREFILLED HYDRAULIC CONTROL APPARATUS

[75] Inventors: David J. Compton, Troy; Richard A. Nix, Utica; Keith V. Leigh-Monstevens, Troy, all of Mich.

[73] Assignee: Automotive Products plc, Warwickshire, England

[*] Notice: The portion of the term of this patent subsequent to Aug. 26, 2003 has been disclaimed.

[21] Appl. No.: 243,148

[22] Filed: Sep. 9, 1988

Related U.S. Application Data

[60] Continuation of Ser. No. 797,405, Nov. 12, 1985, abandoned, which is a division of Ser. No. 607,020, Apr. 30, 1984, Pat. No. 4,607,670, which is a continuation-in-part of Ser. No. 555,667, Nov. 28, 1983, Pat. No. 4,624,290.

[51] Int. Cl.$^5$ .................. F16D 25/08; B60T 11/16
[52] U.S. Cl. .................. 60/533; 60/584; 92/128; 137/614.04; 192/85 CA
[58] Field of Search ............. 141/98 R; 60/584, 533; 188/352; 137/614.03, 614.04; 285/3, 4, 39, 321; 403/315, 317, 328, 360, 365, 375, 368; 192/85 CA; 92/128

[56] References Cited

U.S. PATENT DOCUMENTS

| | | | |
|---|---|---|---|
| 1,634,813 | 7/1927 | Whitehead | 137/614 X |
| 1,703,311 | 2/1929 | Litle | 137/614 X |
| 1,903,736 | 4/1933 | Lauster | 285/3 |
| 1,934,206 | 11/1933 | Page | 60/581 |
| 2,303,577 | 12/1942 | Ottenheimer | 62/299 |

(List continued on next page.)

FOREIGN PATENT DOCUMENTS

| | | | |
|---|---|---|---|
| 1245797 | 10/1960 | France | 137/614.04 |
| 1255063 | 11/1961 | France | . |
| 877206 | 11/1981 | U.S.S.R. | 285/39 |
| 862945 | 3/1961 | United Kingdom | 137/614.03 |
| 1132443 | 11/1968 | United Kingdom | . |
| 1194800 | 6/1970 | United Kingdom | 192/85 CA |
| 1207284 | 9/1970 | United Kingdom | . |
| 1343903 | 1/1974 | United Kingdom | . |
| 1346974 | 2/1974 | United Kingdom | . |
| 1527018 | 10/1978 | United Kingdom | 285/39 |
| 2021226 | 11/1979 | United Kingdom | . |
| 2942120 | 5/1981 | United Kingdom | 285/39 |
| 3043861 | 8/1982 | United Kingdom | 192/85 CA |

OTHER PUBLICATIONS

"Snap-Tite" Catalog, Snap-Tite, Inc.: Union City, Pa., Jul. 1968, (4 pp.).

*Primary Examiner*—Edward K. Look
*Assistant Examiner*—George Kapsalas
*Attorney, Agent, or Firm*—Krass & Young

[57] ABSTRACT

A hydraulic control apparatus, more particularly for operating a motor vehicle clutch release mechanism, comprising a master cylinder, a slave cylinder and a conduit connecting the master cylinder to the slave cylinder. The apparatus is in the form of separate modular units which are separately filled with hydraulic fluid, and the filled modular units are shipped unconnected to a user. Each modular unit is provided with a leakproof quick-connect connector member, through which filling of the modular unit may be effected, and which mates with a complementary leakproof quick-connect connector member of another modular unit, such that after installation on a utilization device, a motor vehicle for example, complementary connector members are reconnected, thus opening ports in each connector member placing each member in fluid communication with the other. Preferably, the two connector members are provided with a one-way locking arrangement preventing separation of the connector members after coupling. Alternatively, the two connector members may be disconnected by a special tool to enable disconnecting the members without loss of hydraulic fluid, for the purpose of repair or replacement of components.

50 Claims, 5 Drawing Sheets

U.S. PATENT DOCUMENTS

| | | | |
|---|---|---|---|
| 2,319,015 | 5/1943 | Speth | 137/614.03 X |
| 2,453,741 | 11/1948 | Bopp | 137/267 |
| 2,511,765 | 6/1950 | Bradbury | 137/614.03 X |
| 2,536,628 | 1/1951 | Denisoff | 60/592 |
| 2,540,649 | 2/1951 | Boylan | 62/299 X |
| 2,545,796 | 3/1951 | Schweier | 137/614.03 X |
| 2,819,914 | 1/1958 | Eitner | 137/614.04 X |
| 2,837,352 | 6/1958 | Wurzburger | 137/614.03 X |
| 2,886,355 | 5/1959 | Wurzel | 285/321 X |
| 2,898,130 | 8/1959 | Hansen | 137/614.04 X |
| 2,934,915 | 5/1960 | Morse | 137/614 X |
| 3,038,575 | 6/1962 | Hansen | 192/85 CA |
| 3,040,886 | 6/1962 | Svenson | 209/555 |
| 3,195,935 | 7/1965 | Beebee | 137/614.03 X |
| 3,285,283 | 11/1966 | Calvin | 137/614.03 X |
| 3,450,424 | 6/1969 | Calisher | 137/614.03 X |
| 3,473,330 | 10/1969 | Fritz | 60/588 |
| 3,654,689 | 4/1972 | Schwarz | 29/888.041 |
| 3,684,069 | 8/1972 | Pray | 192/85 CA |
| 3,776,333 | 12/1973 | Mathauser | 188/344 |
| 3,800,674 | 4/1974 | Sember et al. | 92/97 X |
| 3,805,933 | 4/1974 | Pray | 192/85 CA |
| 3,994,317 | 11/1976 | Miyazaki et al. | 137/614.03 |
| 4,098,293 | 7/1978 | Kramer et al. | 137/614.03 |
| 4,122,678 | 10/1978 | Wilson | 60/571 |
| 4,289,164 | 9/1981 | Elkman | 137/614.03 |
| 4,327,770 | 5/1982 | Brown et al. | 137/614.03 X |
| 4,407,125 | 10/1983 | Parsons | 60/584 |
| 4,456,111 | 6/1984 | Limbacher | 192/85 CA |
| 4,503,678 | 3/1985 | Wimbush | 60/584 |
| 4,506,507 | 3/1985 | Wimbush | 60/584 |
| 4,581,979 | 4/1986 | Compton et al. | 92/23 |
| 4,585,106 | 4/1986 | Shirley | 192/85 CA |
| 4,585,108 | 4/1986 | Leigh-Monstevens | 192/85 CA |
| 4,585,109 | 4/1986 | Shirley et al. | 192/85 CA |
| 4,599,860 | 7/1986 | Parsons | 60/584 |
| 4,601,374 | 7/1986 | Ladin | 192/85 CA |
| 4,609,087 | 9/1986 | Shirley | 192/85 CA |
| 4,620,625 | 11/1986 | Ladin | 192/85 CA |
| 4,637,505 | 1/1987 | Huber | 192/85 CA X |
| 4,687,084 | 8/1987 | Leigh-Monstevens et al. | 192/85 CA |
| 4,779,713 | 10/1988 | Tomala et al. | 192/85 CA X |

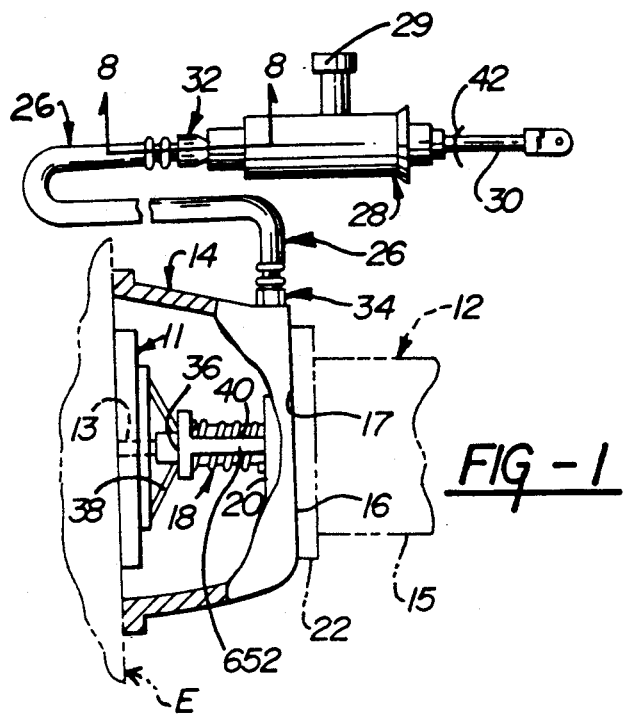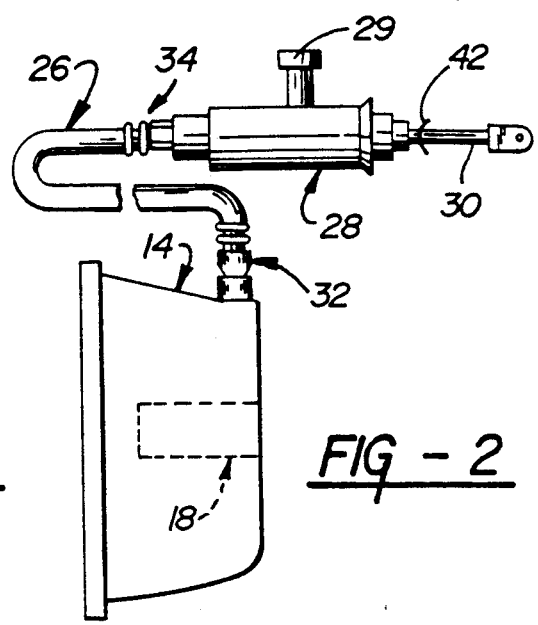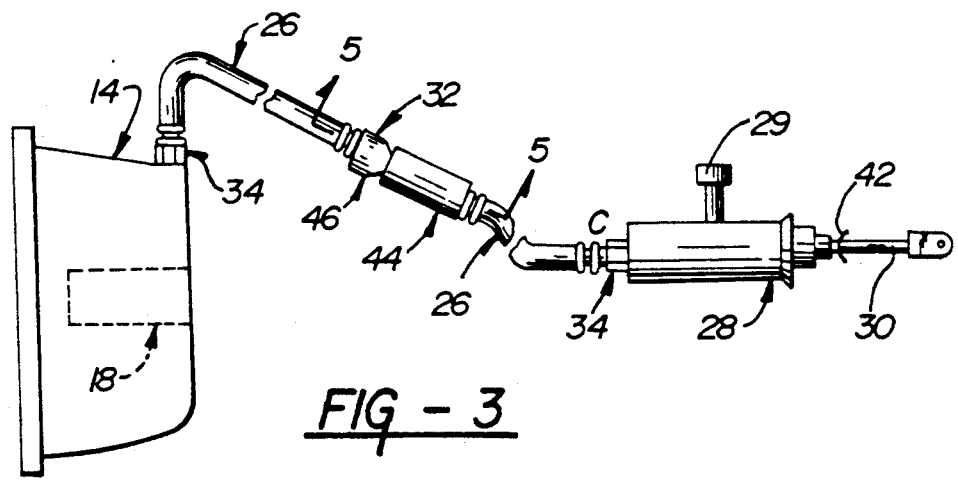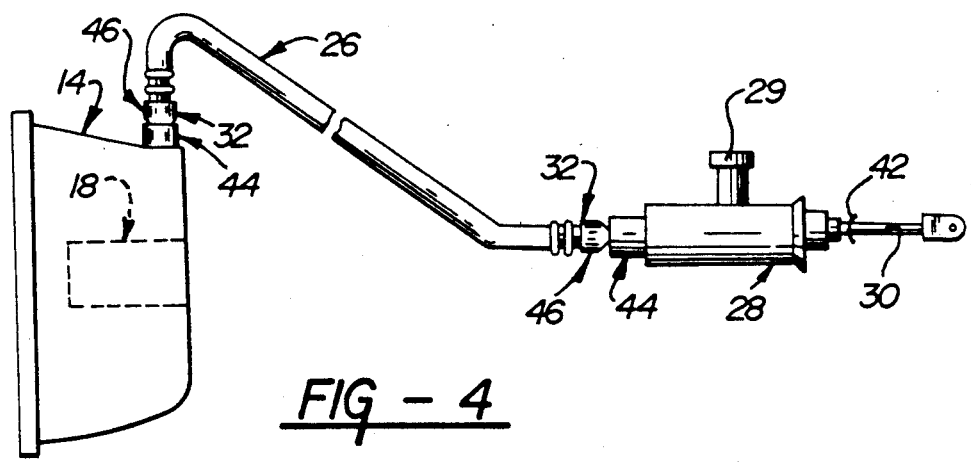

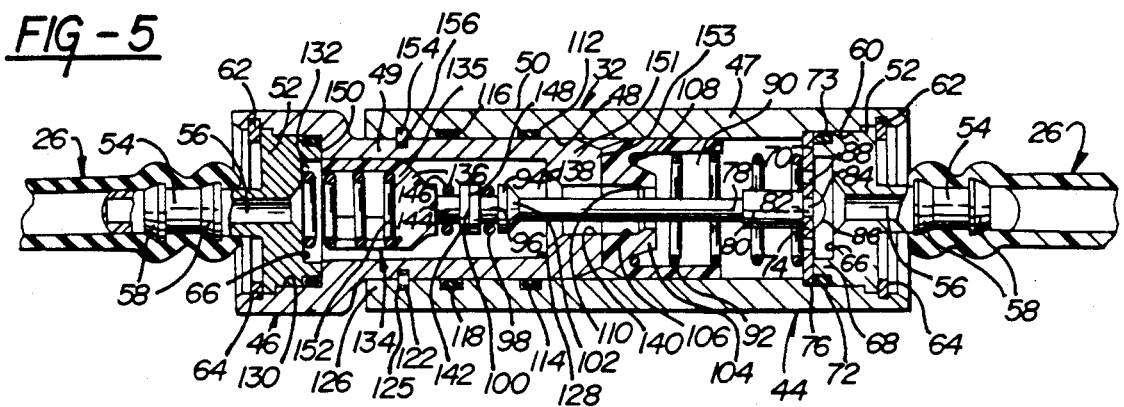
FIG-5
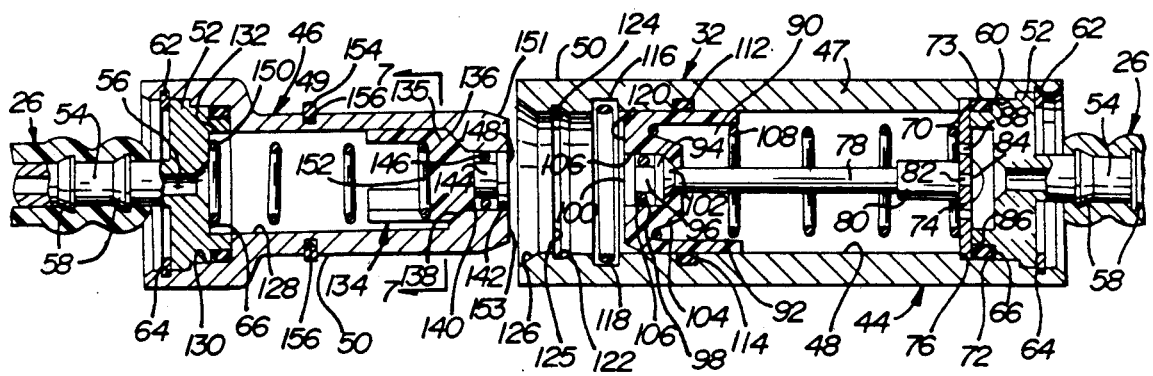
FIG-6
FIG-7
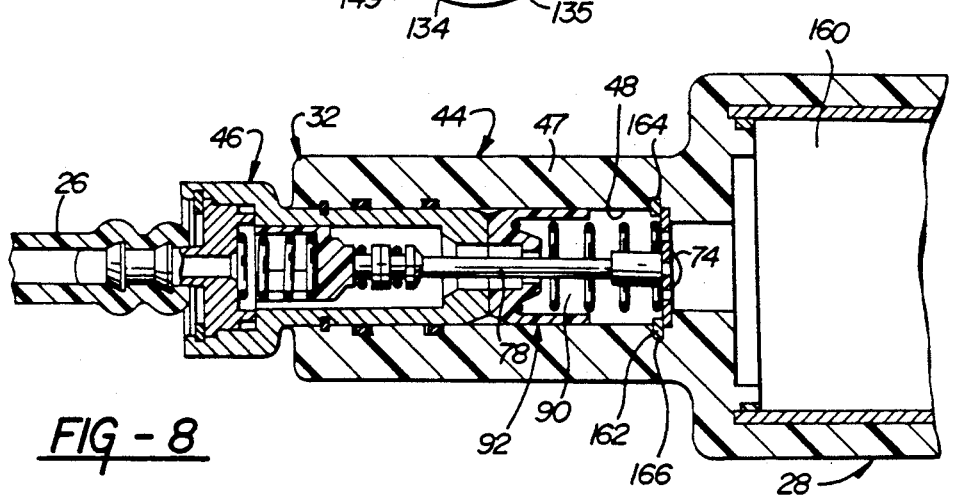
FIG-8

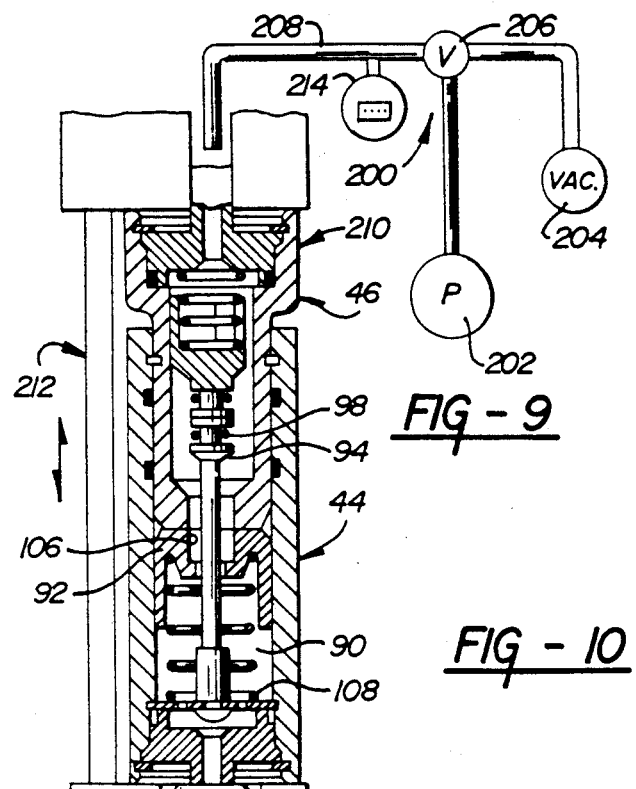
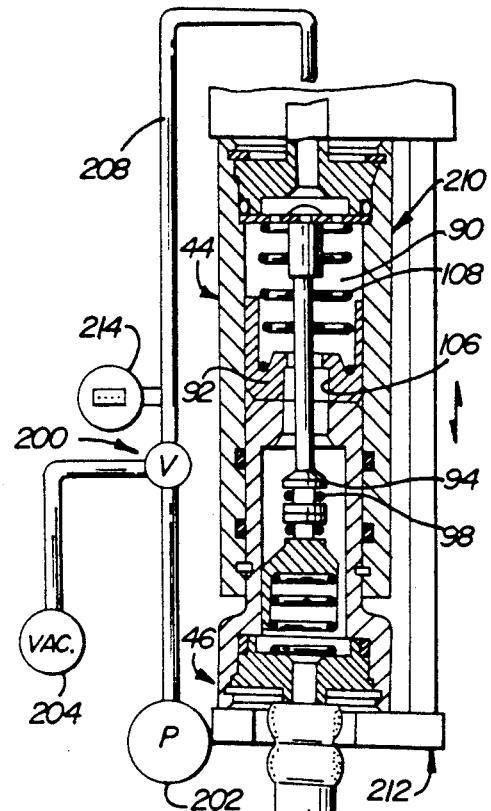
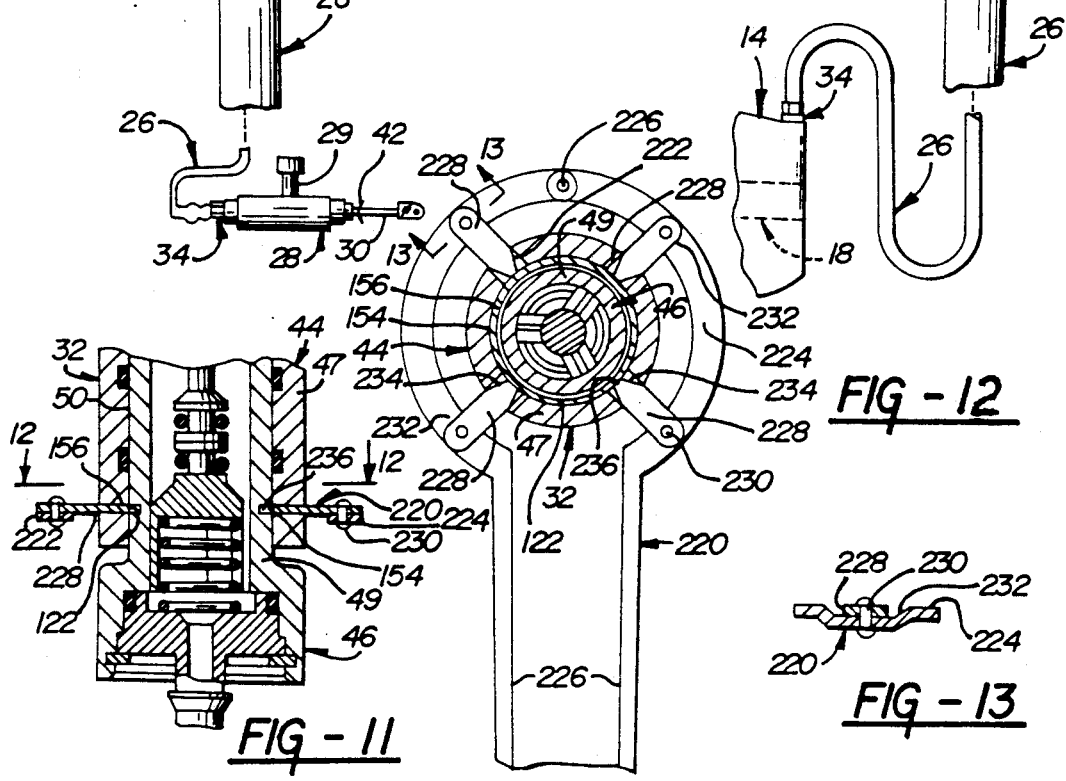
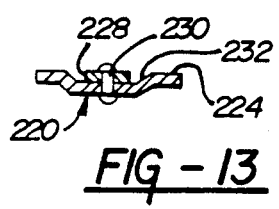

5,018,352

MODULAR PREFILLED HYDRAULIC CONTROL APPARATUS

CROSS-REFERENCE TO RELATED APPLICATIONS

This application is a continuation of application Ser. No. 797,405 filed Nov. 12, 1985, now abandoned, which is a divisional of application Ser. No. 607,020 filed Apr. 30, 1984 now U.S. Pat. No. 4,607,670 which in turn is a continuation-in-part of application Ser. No. 555,667 filed Nov. 28, 1983 now U.S. Pat. No. 4,624,290.

BACKGROUND OF THE INVENTION

The present invention relates to hydraulic apparatus in general, and more particularly to a hydraulic control apparatus comprising a hydraulic master cylinder and a hydraulic slave cylinder for operating a mechanism remotely located from the master cylinder, the hydraulic control apparatus being prefilled with hydraulic fluid and pretested prior to shipment to a motor vehicle manufacturer, for example for installation in a motor vehicle.

It is now known to prefill with hydraulic fluid a motor vehicle clutch control apparatus, comprising a master cylinder, a reservoir of hydraulic fluid, and a slave cylinder for operating the throwout bearing of a mechanical diaphragm spring clutch, as disclosed in U.S. Pat. Nos. 4,407,125, and 4,599,860, assigned to the same assignee as the present application. In addition, co-pending application Ser. No. 338,165, filed Jan. 8, 1982 and U.S. Pat. Nos. 4,506,507, 4,585,106, 4,585,107, 4,585,108, and 4,585,109, all assigned to the same assignee as the present application, also disclose diverse forms of prefilled hydraulic control apparatus for motor vehicle clutches, and co-pending application Ser. Nos. 555,666 and 555,668, both filed on Nov. 28, 1983 discloses prefilled hydraulic control apparatus for transmission shifting mechanisms and throttle mechanisms, respectively.

Prefilling with hydraulic fluid and pretesting hydraulic apparatus for operating motor vehicle mechanisms such as mechanical clutches present the many advantages, for the motor vehicle manufacturer, of receiving a fully assembled mechanism comprising all the components filled with hydraulic fluid and pretested for proper operation, ready to install on a motor vehicle on the assembly line, without requiring that the components be installed separately, connected by way of a flexible conduit, and filled after installation with hydraulic fluid while being purged of any atmospheric air contained in the apparatus.

In apparatus wherein the slave cylinder, actuating the clutch release mechanism, takes the form of a conventional cylindrical cylinder-piston assembly with the piston rod projecting from the cylinder housing attached at its end to the clutch release lever, the slave cylinder being attached at some portion of the clutch bell housing, permanent connection of the master cylinder to the slave cylinder by means of a flexible conduit, and prefill of the apparatus with hydraulic fluid do not present much inconvenience, whether the slave cylinder or the master cylinder is installed first on the vehicle, and the other cylinder installed at some other subsequent station on the assembly line. The last installed component may be simply left dangling on the end of the flexible conduit, or may be attached by means of straps, wires or strings to some portion of the motor vehicle frame or body, until definitely mounted in its operative position. However, with the present trend towards utilizing annular slave cylinders, disposed concentric to the driveshaft and bolted either to the face of the transmission or gearbox casing or, in the alternative, mounted on or made integral with the clutch bell housing, such that the annular piston within the concentric annular slave cylinder may operate the clutch throwout bearing, it is difficult to provide a fully assembled, fully tested, prefilled apparatus, without some accompanying inconveniences. Such inconveniences relate to the requirement that the annular slave cylinder be installed first in the clutch bell housing, or on the transmission casing face, and the master cylinder on the end of the flexible line or conduit interconnecting the master and slave cylinders be provisionally attached, in some manner by strings, wires or straps to the motor vehicle frame, and subsequently installed in its proper position through the passenger compartment floorboard or bulkhead.

The invention disclosed in application Ser. No. 555,667, filed Nov. 28, 1983, remedies the inconveniences enumerated hereinbefore with respect to preassembled prefilled hydraulic control apparatus for motor vehicle mechanical clutches, more particularly in structures wherein the throwout bearing is operated by a concentric annular slave cylinder, while presenting all the advantages of prefilled and pretested clutch control apparatus. Such results are achieved by a pretested prefilled hydraulic clutch control mechanism provided with an irreversible one-way quick-connect fitting or connector either at some point of the flexible conduit connecting the master cylinder to the slave cylinder, or at the end of the conduit connected to the master cylinder, or at the end of the conduit connected to the slave cylinder. The one-way quick-connect fitting or connector is arranged such that after the hydraulic control mechanism has been assembled, prefilled with hydraulic fluid and pretested, the connection between the master cylinder and the slave cylinder may be broken, without loss of fluid, or negligible loss of fluid, and the apparatus may be shipped to the motor vehicle manufacturer, completely filled with hydraulic fluid but in two separate portions such that the concentric slave cylinder may be made a part of the clutch bell housing, or of the transmission casing, and thus installed in the motor vehicle at whatever station on the assembly line that the clutch or transmission is installed, and such that the master cylinder may be installed in the motor vehicle also at whatever appropriate station, and the two connected together without any loss, or negligible loss, of fluid and without introduction of air into the apparatus.

SUMMARY OF THE INVENTION

The present invention also has for principal object to provide a prefilled hydraulic clutch control mechanism provided with a one-way quick connect fitting or connector between the master cylinder and the slave cylinder. The one-way quick connect fitting or connector may be disposed at either end of the flexible line or conduit connecting the master cylinder to the slave cylinder, or may be disposed at some intermediary point between the ends of the flexible conduit. The one-way quick connect fitting or connector is made of two half-connectors, a female member and a male member which, once coupled, cannot be uncoupled. In the alternative, where it is desired to enable the quick-connect fitting or connector halves to be uncoupled for the purpose of part replacement or repair, they can be uncoupled only by means of a special tool.

The present invention, as the one disclosed in copending application Ser. No. 555,667, permits to assemble a hydraulic control apparatus, prefill it with hydraulic fluid and pretest it. After this has been accomplished, the connection between the master cylinder and the slave cylinder may be broken, without loss of fluid, or negligible loss of fluid, and the apparatus may be shipped to a motor vehicle manufacturer, completely filled with hydraulic fluid but in two or three separate portions, such that the slave cylinder may be made a part of the clutch bell housing, or the transmission casing, and thus installed in the motor vehicle at whatever convenient station on the assembly line that the clutch or transmission is installed, and such that the master cylinder may be installed in the motor vehicle at whatever appropriate station of the assembly line, and the two connected together without any loss of fluid and without the introduction of air into the apparatus. In addition, the present invention permits to prefill the hydraulic control apparatus in its separate portions, and to connect the portions on the assembly line without loss of fluid and without introduction of air into the apparatus, thus doing away with the requirement of filling the apparatus with hydraulic fluid and appropriately bleeding the apparatus after installation on a motor vehicle on the assembly line. Furthermore, the present invention permits to effectuate any repair on the motor vehicle requiring disconnecting the master cylinder from the slave cylinder, such as for example effecting repairs on the engine, on the clutch or on the transmission, which may require removal of a component from the motor vehicle and disconnecting the slave cylinder from the master cylinder especially in installations wherein the slave cylinder is an annular cylinder mounted around the motor vehicle driveshaft. As a further advantage, the present invention permits to replace one of the components of the hydraulic control apparatus without the requirement of replacing the other components and without the requirement of refilling and bleeding the whole system after replacement of a component. The present invention has many applications to other automotive mechanisms, such as hydraulic brake system, hydraulic gear shifters and hydraulic throttle controls, for example.

Other objects and advantages of the present invention will become apparent to those skilled in the art when the following description of the best modes contemplated for practicing the invention is read in conjunction with the accompanying drawing wherein like reference numerals refer to like or equivalent parts, and in which:

BRIEF DESCRIPTION OF THE DRAWINGS

FIG. 1 is a schematic representation of a clutch hydraulic control apparatus according to the present invention;

FIGS. 2 through 4 are views generally similar to FIG. 1 but showing modifications thereof;

FIG. 5 is a partial section along line 5—5 of FIG. 3;

FIG. 6 is a view similar to FIG. 5, but showing the two separate halves of a leakproof quick-connect fitting or connector forming part of the present invention prior to coupling;

FIG. 7 is a transverse section along line 7—7 of FIG. 6;

FIG. 8 is a partial section along line 8—8 of FIG. 4;

FIG. 9 is a partly schematic view illustrating the manner in which a portion of the hydraulic control apparatus of the invention is prefilled with hydraulic fluid;

FIG. 10 is a view similar to FIG. 9, but showing a modification thereof;

FIG. 11 is a partial section through a leakproof quick-connect fitting or connector according to the present invention showing a modification permitting to disconnect the male and female members of the fitting by means of an example of a special disconnect tool;

FIG. 12 is a view from line 12—12 of FIG. 11;

FIG. 13 is a partial section along line 13—13 of FIG. 12;

FIG. 7 is a partial longitudinal section of the clutch hydraulic control apparatus of FIG. 2.

DETAILED DESCRIPTION OF THE PREFERRED EMBODIMENTS

Figure 14:
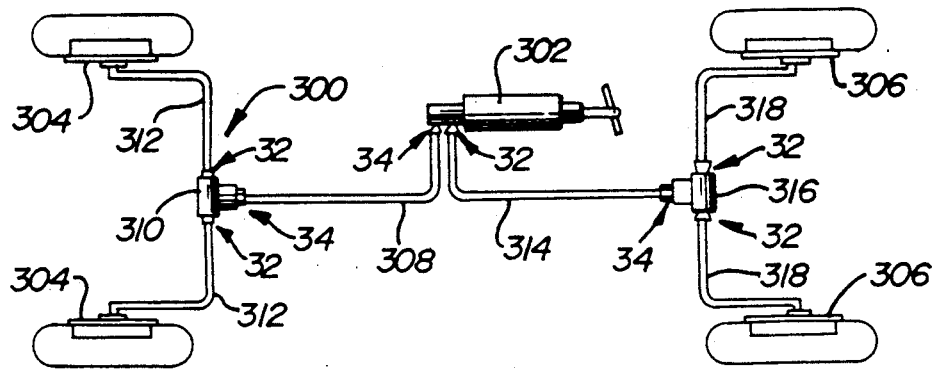
FIGS. 14–16 are examples of further applications of the invention.

Referring to the drawing, and more particularly to FIG. 1, a motor vehicle transmission is schematically illustrated as comprising a friction clutch assembly 11 and a gearbox 12 enclosed in a casing or housing 15. A driveshaft 13 drives the gearbox 12 from the clutch assembly 11. A bell housing 14, surrounding the clutch assembly 11, is bolted on the rear face of the motor vehicle engine E. The rear face 16 of the bell housing 14 is bolted to the face 17 of the gearbox casing 15. An annular hydraulic slave cylinder 18 is disposed around the driveshaft 13 within the bell housing 14. In the example of structure illustrated, the slave cylinder 18 has a one-piece housing 20 cast integral with the clutch bell housing 14. The face 17 of the gearbox casing 20 is on a flange 22, and an end plate, not shown, closing the end of the gearbox casing 15 is also bolted to the face 17 of the gearbox casing 15, the transmission input shaft 13, as shown in dashed lines, projecting through the end plate 24.

The slave cylinder 18 is connected via a line or conduit 26 to a master cylinder 28. The master cylinder 28 is provided with a built-in hydraulic fluid reservoir 29, in the example of structure illustrated, and has an input rod 30 pivotally connectable at an end to a clutch control pedal, not shown, installed within the driver compartment of a motor vehicle, not shown. The rod 30, as is well known, is connected to a piston, not shown, disposed in the master cylinder 28 for displacing the hydraulic fluid through the line 26 to the slave cylinder 18 when the clutch pedal is depressed. The line or conduit 26 is a flexible conduit or hose having a connector 32 for connection to the inlet of the slave connector 18, and has another connector 34 on the other end for connection to the outlet of the master cylinder 28.

Although the slave cylinder 18 is, in the illustrated example of structure, of the type having a housing 20 which is formed integral with the clutch bell housing 14, it will be appreciated that the slave cylinder may in the alternative, be formed integral with the transmission or gearbox casing end plate, as disclosed in U.S. Pat. No. 4,684,003, assigned to the same assignee as the present application. In such structures, the slave cylinder 18 is already integral or preassembled to the clutch bell housing 14, as illustrated, when the bell housing is bolted to the gearbox casing 15 during assembly of a motor vehicle or, in its alternate configuration, not shown here, the slave cylinder is already preassembled to the transmission or gearbox casing 15 by being made part of the casing end plate. It will be appreciated by those skilled in the art that the invention may be used in combination with any type of concentric slave cylinder as disclosed in detail in the aforesaid U.S. Pat. No. 4,684,003, or to any hydraulic control apparatus for a motor vehicle mechanical clutch, whether utilizing a concentric slave cylinder or a more conventional cylindrical slave cylinder.

The slave cylinder 18, as disclosed in detail in the aforesaid pending application, is adapted to displace a throw-out bearing 36 engaged with the end of the clutch release fingers 38, for releasing the clutch 11 when hydraulic fluid is introduced into the slave cylinder 18 from the master cylinder 28 through the conduit 26. After manufacturing and assembly of the hydraulic apparatus, and prior to filling the apparatus with hydraulic fluid, a restraining strap 40, of the type disclosed in more details, for example, in U.S. Pat. No. 4,684,003, filed Sept. 30, 1983, is installed for holding the throw-out bearing 36 in a retracted position, during shipment of the hydraulic apparatus and installation of the integral subassembly of the slave cylinder 18 and bell housing 14 on a motor vehicle, in the example of structure illustrated. During filling with hydraulic fluid of the hydraulic apparatus, and during shipment and installation of the master cylinder 28 on a motor vehicle, the input rod 30 of the master cylinder is held in an extended position by means such as a clip 42, for example, as disclosed in more detail in copending application Ser. No. 509,998, also assigned to the same assignee as the present application.

In the example of structure illustrated at FIG. 1, the fitting or connector 32, connecting an end of the conduit 26 to the master cylinder 28, is of the leakproof quick-connect type, while the fitting or connector 34 connecting the other end of the conduit 26 to the slave cylinder 18 is of the conventional type. In this manner, after the hydraulic apparatus has been filled with hydraulic fluid, the line or conduit 26 may be broken at the connector 32 without loss of hydraulic fluid or, in the alternative, and as hereinafter explained, the master cylinder 28 may be prefilled with hydraulic fluid as a separate first modular unit, while the slave cylinder 18 and the conduit 26 may be filled with hydraulic fluid as a separate second modular unit, the two separate modular units being reconnected after installation of the hydraulic apparatus on a motor vehicle.

In the example of structure of FIG. 2, the leakproof quick-connect connector 32 is used for connecting one end of the line 26 to the slave cylinder 18, while the other end of the conduit 26 connected to the master cylinder 28 is provided with a conventional connector 34. The hydraulic apparatus may thus be broken at the leakproof quick-connect connector 32, after filling and testing of the apparatus, or, in the alternative, the separate modular units consisting of the master cylinder 28 with the hose or conduit 26 attached thereto, and of the slave cylinder 18, contained within the bell housing 14, may be separately prefilled and readily connected after installation of the units on a motor vehicle.

FIG. 3 illustrates a clutch hydraulic control apparatus according to the present invention wherein the conduit 26 is connected to the master cylinder 28 by way of a conventional connector 34 attached to an end of the conduit and the other end of the conduit 26 is connected to the slave cylinder 18 also by way of a conventional connector 34. At some point between the ends of the conduit 26, a leakproof quick-connect connector 32 is disposed such as to permit installing the master cylinder 28 on a motor vehicle with a portion of the conduit 26 attached thereto, and to permit installing the slave cylinder 18 on the motor vehicle already pre-installed in or made integral with the bell housing 14, in the structure illustrated, or pre-installed on, or integral with, the transmission end cover. The hydraulic apparatus may be prefilled with hydraulic fluid and pretested in the manufacturer's plant as a complete assembly, or it may be prefilled and pretested in separate modular sub-assemblies, one consisting of the slave cylinder 18 with a portion of the conduit 26 attached thereto, and the other consisting of the master cylinder 28 with the other portion of the conduit 26 attached thereto, and the connection between the ends of the portions of the conduit 26 each provided with one half of the leakproof quick-connect connector 32 is effected during assembly of the motor vehicle.

FIG. 4 illustrates an extreme arrangement for a hydraulic control apparatus according to the invention having practical applications especially in installations wherein the master cylinder 28 and the slave cylinder 18 are located at considerable distance from each other, such as for example in a rear-engine motor coach or the like, and the routing of the flexible conduit 26 through the frame or the body of the motor vehicle is more conveniently effected with the ends of the conduit 26 unattached to the master cylinder 28 and to the slave cylinder 18, respectively. The conduit 26 is provided with a leakproof quick-connect connector 32 at each end, and such an arrangement still permits to effectuate a bench filling of the apparatus with hydraulic fluid and testing of the apparatus prior to shipment to the motor vehicle manufacturer. The apparatus is subsequently broken in three separate components or modular units, already filled with hydraulic fluid, one being the master cylinder 28, the other the slave cylinder 18 and the third one the conduit 26. During assembly of the motor vehicle, the three separate components are interconnected without loss of fluid and without introduction of air in the system. Furthermore, if so desirable, the master cylinder 28, the slave cylinder 18 and the conduit 26 may be prefilled and pretested individually.

As illustrated in detail at FIGS. 5 and 6, the leakproof quick-connect connector 32 of FIG. 3 consists of two complementary half-connectors or members 44 and 46, each formed of a tubular body 47 and 49, respectively. As logic indicates, the half-connector 44 is of the female type and its tubular body 47 has a bore 48 capable of slidably accepting the cylindrical peripheral surface 50 of the tubular body 49 of the half-connector 46, which is evidently of the male type. FIG. 5 illustrates the two female and male members 44 and 46 coupled, as also shown at FIG. 3, while FIG. 6 illustrates the female member 44 and the male member 46 uncoupled prior to introducing the tubular body 49 of the male member 46 into the bore 48 of the female member 44, after installation of the master cylinder 28 and of the slave cylinder 18-clutch bell housing 14 sub-assembly in their respective locations on a motor vehicle.

The tubular body 47 of the female member 44 has an end cap 52 provided with an integral outwardly projecting fitting 54, a passageway 56 permitting fluid communication with the interior of the conduit 26 having its end fitted over the fitting 54, and being adequately clamped thereon or, as illustrated, being elastically held over by means of a pair of tapered annular ridges 58 projecting from the peripheral surface of the fitting 54. The end cap 52 fits in an enlarged diameter end portion 60 of the bore 48 and is held in assembly by means of a spring steel snap-ring 62 elastically expanded in a groove 64, interiorly formed proximate the end of the tubular housing 47. The interior end face 66 of the end cap 52 is recessed as a result of being provided with an integral projecting annular ridge or rim 68 forming an end annular abutment surface 70. The annular rim 68 has an outer peripheral surface spaced from the internal surface of the enlarged diameter portion 60 of the bore 48, such as to form an L-shaped groove 72 in which is disposed an elastomeric O-ring 73. A circular plate 74 of a diameter permitting fitting thereof within the enlarged diameter portion 60 of the bore 48 is engaged on one side with the annular abutment surface 70 of the end cap 52, and on its other side with an annular shoulder 76 formed at the junction between the bore 48 of the tubular body 47 and the enlarged diameter bore portion 60 in which is fitted the end cap 52, such as to fixedly hold the circular plate 74 in position as shown. The circular plate 74 supports a rod 78 at its enlarged foot portion 80 having a mounting stem 82 passed through a central aperture 84 in the circular plate 74, the projecting end of the stem 82 being formed as a rivet head 86 for holding the rod 78 fixedly about the longitudinal axis of the bore 48. Apertures, such as shown at 88, are provided through the circular plate 74 such as to permit hydraulic fluid to circulate to and fro between the passageway 56 and a chamber 90 defined in the bore 48 of the female member 44 below a generally cup-shaped spool member 92 slidably disposed in the bore 48. The rod 78 has an enlarged head 94 provided with a groove 96 in which is disposed an elastomeric O-ring 98. The top of the enlarged head 98 forms a circular abutment surface 100 and the bottom of the enlarged head 94 forms a tapered abutment surface 102. The spool member 92 has an internally directed boss 104 provided with a port defined by a bore 106 capable of accepting the rod enlarged head 98 when the spool member 92 is displaced by a compressed coil spring 108, disposed between the circular plate 74 and the cup-shaped spool member 92, urging the spool member 92 to the position shown at FIG. 6, causing engagement of the tapered abutment face 102 with a corresponding tapered abutment end surface 110 at the end of the bore 106 within the valve spool boss 104.

It is immediately apparent that in the position of the spool member 92 illustrated at FIG. 6, the enlarged head 94 of the rod 78 being engaged within the port defined by the bore 106 in the spool valve boss 104, the elastomeric O-ring 98 in the groove 96 prevents leakage of fluid from the chamber 90 to the open end of the female member tubular body 47. An elastomeric O-ring 112, disposed in an annular groove 114 in the surface of the bore 48 prevents leakage of fluid past the peripheral surface of the spool member 92, the elastomeric O-ring 74 evidently preventing leakage of fluid past the end cap 52. The bore 48 in the female member tubular body 47 is further provided with an internal groove 116 in which is disposed an elastomeric O-ring 118, the groove 116 and the elastomeric O-ring 118 being located proximate the open end of the tubular body 47 beyond the annular end face 120 of the spool member 92. A further annular groove 122 is formed proximate the end of the tubular body 47. The groove 122 has a tapered sidewall 124 and a radial sidewall 125, and the bore 48 gradually increases in diameter at the end of the tubular body 47, such as to form a funnel-shaped or tapered wall 126.

The tubular body 49 of the male member 46 has an internal bore 128 provided with an enlarged diameter end bore portion 130 in which is fitted an end cap 52 identical to the end cap 52 closing the end of the tubular body 47 of the female member 44. The fitting 54 of the male member end cap 52 is attached to the end of the corresponding length of conduit 26, and the passageway 56 through the fitting 54 and the end cap 52 allows transfer of hydraulic fluid to and fro between the conduit 26 and an internal chamber 132 defined in the bore 128 of the male member tubular body 50. Utilizing identical end caps 52 for the male member 46 and the female member 44 results in a considerable reduction of part inventory.

A spider member 134 has legs 135, three in number, FIG. 7, in the example of structure illustrated, radially extending for sliding engagement with the surface of the internal bore 128 such as to provide lateral support for the spider member 134. The spider member 134 has a frontal abutment 136 engageable with an abutment annular surface 138 formed between the principal bore 128 within the tubular body 50 and a port in the form of a reduced diameter end bore portion 140. The spider member 134 supports, or is made integral with, a head or spool 142 of an outer diameter fitting the reduced diameter end bore 140, and provided with a groove 144 containing an elastomeric O-ring 146. The spool 142 has a flat abutment end face 148. A coil spring 150 disposed in compression between the annular recessed face 66 of the end cap 52 and the rear face 152 of the spider member 134 normally urges the spider member 134 and the spool 142 carried on the end thereof to the position shown at FIG. 6 wherein the spool 142 is engaged within the reduced diameter end bore 140 and the compressed O-ring 146 prevents transfer of fluid from the chamber 132 to the ambient, the abutments 136 of the spider member legs 135 in engagement with the tubular body shoulder abutment 138 limiting the forward travel of the spider member 134. The male member tubular body 49 is peripherally tapered, as shown at 151, to facilitate introduction of the male member tubular body 49 into the tapered end 126 of the bore 48 of the female member tubular body 47.

The male member tubular body 50 has an annular end face 153 which, during engagement of the male member 46 within the female member 44, engages the annular end face 120 of the cup-shaped spool member 92 disposed within the bore 48 of the female member tubular body 47, progressively retracting the cup-shaped spool member 92 from its position shown at FIG. 6 to the position shown at FIG. 5. During engagement of the male member 46 into the female member 44 the elastomeric O-ring 118 in the internal groove 116 in the bore 48 of the female member tubular body 47 engages the peripheral cylindrical surface 50 of the male member tubular member 49 such that when the annular end face 153 at the tip of the male tubular member 49 has retracted the valve spool 92 sufficiently as to cause the enlarged head 94 on the end of the rod 78 to be no longer disposed within the bore 106 in the spool member 92, hydraulic fluid is allowed to circulate to and fro relative to the chamber 90 within the female member tubular body 42 and the chamber 132 within the bore 128 of the male member tubular body 49, as a result of the end face 100 of the enlarged head 94 of the rod 78 engaging the end face 148 of the spool 142 on the end of the spider member 134 causing the spool 142 and the spider member 134 to be retracted within the bore 128, and thus disengaging the spool 142 from within the reduced diameter bore 142 against the tension of the spring 150, thus opening a direct fluid communication between the chambers 90 and 132. As the male member 46 is progressively pushed into the female member 44, and the spool member 92 is progressively retracted, the elastomeric O-ring 112 in the internal groove 114 in the bore 48 of the female member tubular body 47 elastically encircles and engages the peripheral surface 50 of the male member tubular body 49, further ensuring, in co-operation with the elastomeric O-ring 118, that no fluid leaks to the ambient.

In the coupled position illustrated at FIG. 5, a resilient snap ring 154, disposed in a peripheral groove 156 formed in the peripheral cylindrical surface 50 of the male member tubular body 49 and which has been progressively contracted while being pushed against the converging tapered entrance surface 126 of the bore 48 in the female member tubular body 47, has been allowed to expand when reaching the internal groove 122 proximate the open end of the bore 48 in the female member tubular body 47. The tapered inner wall 124 of the groove 122 aids in locating the snap ring 154 relative to the groove 122. The snap ring 154 freely expands such as to be fully engaged within the groove 122 with the trailing face of the snap ring 154, engaged in solid abutting relationship with the straight radial wall 125 of the groove 122, such that when the connector female member 44 and the connector male member 46 are coupled, as shown at FIG. 5, unauthorized separation of the two members is prevented.

For coupling the end of the conduit 26 to the master cylinder 28, FIG. 1, by means of the leakproof quick-connect connector 32, or for coupling the end of the conduit 26 to the slave cylinder 18, FIG. 2, by means of the quick-connect connector 32 or, alternatively, for connecting both ends of the conduit 26 to a respective cylinder, FIG. 3, by way of a leakproof quick-connect connector 32 on each end of the conduit 26, it is preferable to attach the connector female member 44 to the respective cylinder or to form the female member integral with the cylinder. All that is required is to provide a bore for installation therein of the rod 78 and of the spool valve 92, the bore such as bore 48 being disposed in direct communication with the internal bore 160 of the master cylinder 28, as schematically illustrated at FIG. 8, or the internal bore 48 being part of the passageway leading into the fluid chamber of the slave cylinder.

FIG. 8 illustrates an example of structure for connecting the end of the conduit 26 provided with a connector male member 46 to a master cylinder 28, the tubular body 47 of the connector female member 44 being formed integral with the housing of the master cylinder 28 which, in the example of structure illustrated, is made of plastic. The bore 160 of the master cylinder 28 is placed in direct communication with the female member bore 48. The perforated circular plate 74 supporting the rod 78 is mounted at the bottom of the bore 48 abutting against an annular shoulder 162 and held in position by a spring steel snap ring 164 engaged in an internal groove 166. The remaining of the structure illustrated at FIG. 8 is exactly the same as the structure of the leakproof quick-connect connector 32 previously described with more particular detail in reference to the structure illustrated at FIGS. 5-7.

Preferably, the male member tubular body 49 and the female body tubular body 47, FIGS. 5-6, and the end caps 52 are made of metal or metal alloys, such as steel or aluminum alloy for example. Preferably, the spider member 134 is made of a plastic molding and the cup-shaped spool member 92 is also made of plastic. The rod 78 may be made of metal or plastic. However, it will be readily apparent that the tubular body members 49 and 47 may also be made of plastic, and in structures wherein one of the tubular member body is made integral with the master cylinder housing or the slave cylinder housing, it is evidently made of the same material as the cylinder housings themselves.

Whatever the structure adapted for particular applications, the hydraulic apparatus of the invention is conveniently prefilled with hydraulic fluid and pretested as described in detail in U.S. Pat. No. 4,506,507, the two halves of the leakproof quick-connect connector 32 being coupled by means of an appropriate clamping mechanism, the interlocking ring 154 being omitted. After prefilling of the hydraulic apparatus with hydraulic fluid and testing, the two halves of the connector 32 are uncoupled, the ring 154 is installed in its groove 156 in the peripheral surface 50 of the male member tubular body 49, and the diverse components are shipped to a motor vehicle manufacturer, prefilled with hydraulic fluid, for installation on a motor vehicle.

Alternatively, and as illustrated schematically at FIGS. 9 and 10, the diverse modular components of the hydraulic apparatus may be prefilled individually with hydraulic fluid. FIGS. 9 and 10 illustrate an apparatus and method for prefilling the hydraulic apparatus of FIG. 3 in its two separate modular components, one consisting of the master cylinder 28 with a length of flexible conduit 26 readily installed by means of a conventional connector 31 onto the master cylinder 28, the female member 44 of the leakproof quick-connect connector 32 being installed at the end of the length of flexible conduit 26, and a second length of flexible conduit 26 being connected by means of a conventional connector 34 to the slave cylinder 18 at other end being provided with the female member 46 of the quick-connect connector 32.

As illustrated at FIGS. 9 and 10, the hydraulic fluid filling apparatus 200 comprises a supply of hydraulic fluid 202, and a source of suction or vacuum 204 connected through a three-way valve 206 to a line 208 having an appropriate fitting generally designated at 210. Although the fitting 210 may take any appropriate form that fits a complementary half of the connector 32, provided with appropriate means for opening the port of the half connector, it is readily apparent that for the sake of convenience the fitting 210 may actually be a male member 46 when it is desired to fill with hydraulic fluid the portion of the hydraulic apparatus terminated by a connector female member 44, FIG. 9, and a female member 44 where it is desired to couple the hydraulic fluid filling apparatus 200 to a portion of the hydraulic apparatus terminated by a connector male member 46, FIG. 10.

As shown at FIG. 9, the fitting 210, taking the form of a connector male member 46, is coupled to the connector female member 44, on the end of the length of flexible conduit 26, by means of a clamping means 212, the resilient snap ring 154 (FIGS. 5-6) being omitted such that after the filling operation has been effected, and the clamping means 212 released, the fitting 210 is readily disconnected from the connector female member 44. In the clamped position illustrated in the drawing, the line 208 is in fluid communication with the length of flexible line 26, which in turn is in communication with the fluid chamber within the master cylinder 28, the fluid chamber within the master cylinder 28 being in fluid communication with the hydraulic fluid reservoir 29 in view of the extended position of the pushrod 30 as held by the clip 42 causing the piston, not shown, in the master cylinder 28 to be in a retracted position unmasking the port between the fluid chamber in the master cylinder and the reservoir 29. The valve 206 is switched to the position placing the vacuum source 204 in communication with the conduit 208, and the conduit 20 and the master cylinder 28, via the fitting 210 and the connector female member 44 such as to evacuate atmospheric air therefrom. The test of the integrity of the hydraulic apparatus portion may be effected by maintaining the vacuum and switching the valve 206 to a closed position, and measuring the vacuum in the line 208 over a predetermined period of time by way of a gauge 214. Subsequently, the valve 206 is turned to a position placing the hydraulic fluid supply 202, preferably maintained at a pressure slightly higher than atmospheric pressure, in communication with the line 208 such as to fill the length of flexible conduit 26, the master cylinder 28 and the fluid reservoir 29 with hydraulic fluid, together with the chamber 90 within the connector female member 44. As the clamping means 212 is released and the fitting 210 and connector female member 44 become progressively uncoupled, the spool valve 92 is progressively displaced, under the action of the spring 108 in a direction that increases the volume of the fluid chamber 90, until the port defined by the bore 106 at the tip of the spool member 92 is closed by the enlarged head 94, provided with the O-ring 98, as illustrated at FIG. 6 with respect to the connector female member 44.

FIG. 10 illustrates the fitting 210, in the form of a connector female member 44, mounted on the end of the line 208 of the filling apparatus 200, in clamped coupling engagement with the connector male member 46 on the end of the length of flexible conduit 26 connected to the slave cylinder 18, preparatory to evacuating the hydraulic apparatus modular portion from atmospheric air, testing and filling with hydraulic fluid as previously explained.

It will be readily apparent to those skilled in the art that the filling apparatus 200 may be used with appropriate fixturing and clamping mechanisms for filling any modular portion of a hydraulic apparatus provided with one half of a full quick-connect connector 32 at the master cylinder end of the conduit 26, FIG. 1, at the slave cylinder end of the conduit 26, FIG. 2, at some point between the ends of the conduit 26, FIG. 3, or at both ends of the conduit 26, FIG. 4.

The structure of FIG. 4 may also be filled with hydraulic fluid in the form of two separate modular units, one consisting of the slave cylinder 18, the other consisting of the master cylinder 28, and the third consisting of the conduit 26 on each end of which is mounted a half connector such as, for example, a connector male member 46, a connector female member 44, or a female member on one end and a male member on the other end. The filling and testing apparatus 200 is conveniently used in the same manner as previously described for the purpose of filling each separate modular unit, including the conduit 26. The conduit 26 is individually filled by being first evacuated from atmospheric air, tested as to integrity if so desired, and subsequently filled with hydraulic fluid through one of the half connectors at one end of the conduit. The half connector at the other end of the conduit 26 remains closed during evacuation of the atmospheric air as long as the force of the spring 108, FIG. 6, urging the spool member 92 to the position closing the connector female member 44 is high enough to overcome the atmospheric pressure applied on the end of the spool valve, in structures where a female member 44 is mounted on the free end or on both ends of the conduit 26, and as long as the force exerted by the spring 150 urging the spider member 134, in the connector male member 46, to a closed position is sufficient to overcome the atmospheric pressure applied to the frontal area of the end face 148 of the spool 142 on the end of the spider member, in structures having a connector male member 46 mounted on the free end of the conduit 26. For example, in a connector 32 according to the present invention having an overall diameter of about 24 mm. and an internal diameter of about 16 mm. for the bore 48 of the connector female member 44, all other dimensions of the elements being proportionally at the same scale, the coil spring 108 in the connector female member 44 needs to exert only a force of 1,800 grams, or 65 oz., and the coil spring 150 in the connector male member 46 needs to exert a force of only 300 grams, or 11 oz.

The leakproof quick-connect fitting or connector 32 heretofore described is of the one-way type. In other words, once the two halves of the connector, namely the female member 44 and the male member 46, are reconnected on a motor vehicle assembly line, for example, the internal locking between the members provided by the snap ring 154 being partially disposed in the groove 156 on the periphery of the male member tubular body 49 and in the groove 122 in the surface of the bore 48 of the female member tubular body 47, the male member 46 can no longer be uncoupled from within the female member 44. Such an arrangement preserves the integrity of the system and prevents tampering by unauthorized persons. However, it presents the inconvenience that if one of the components requires repair or replacement, the whole apparatus must be replaced, especially in sealed units where no provisions are made for replenishing the supply of hydraulic fluid and for bleeding the apparatus. It also presents the inconvenience that if work is to be effected on the motor vehicle engine, clutch or transmission, which requires removal of the affected component from the motor vehicle, the slave cylinder cannot be readily disconnected from the master cylinder. Such inconvenience is avoided by the modified connector structure of FIGS. 11-12, requiring the use of a special tool for disconnecting the two halves of the leakproof quick-connect connector 32. An example of such special tool is illustrated at 220 at FIGS. 11-13.

As shown at FIGS. 11-12, the modification that permits uncoupling of the two halves of the connector 32 consists in forming a plurality of slots 222, for example three, or four as illustrated, extending radially through the wall of the female member tubular body 47 from the periphery thereof to the groove 122. The tool 220 takes the form of a partial ring 224 hinged at 226, and provided with a pair of symmetrically disposed extending handles 226. Four tangs 228, in the example of structure illustrated, each corresponding to one of the slots 222, are disposed at 90° from each other, radially projecting inwardly relative to the ring 224. Each tang 228 is pivotally mounted on one surface of the ring 224 by means of a pivot pin 230. The ring 224 has a shallow recess 232, best shown at FIG. 13, at the location where each tang 228 is pivotally attached to the ring, such as to permit only limited pivoting of the tang 228 about the pivot pin 230. Other means, such as return springs, may be used for urging the tangs 228 to a radial neutral position while still permitting limited pivoting facilitating introduction of the tip of each tang in a slot 222 after opening the tool 220 about the hinge 226 by spreading apart the handles 226 such as to permit the ring 224 to encircle the connector 32. Each tang 228 has a tapered tip 234 to facilitate introduction of the tip into a slot 222 and, when the handles 226 are manually pressed towards each other, the tip end surface 236 of the tang engages the outer surface of the ring 154 and compresses the ring to the bottom of the groove 156, thus causing the peripheral surface of the ring 154 to be flush with the peripheral surface 50 of the male member tubular body 46. The ring 154 being no longer engaged partially in the groove 122 in the female member tubular body 47, the female member 44 and the male member 46 may be uncoupled. If so desired, the slots 222 may be protected by a turn of adhesive plastic tape after installation of the hydraulic control apparatus of the invention on a motor vehicle, to prevent introduction of dirt in the slots 222 that may interfere with the operation of the tool 220 when it is desired to disconnect the two halves of the connector 32. It will be immediately apparent to those skilled in the art that the requirement for a special tool, such as the tool 222, will normally be a deterrent to any attempt by unauthorized persons to uncouple the two halves of the connector 32 so provided with the slots 222.

Figure 15:
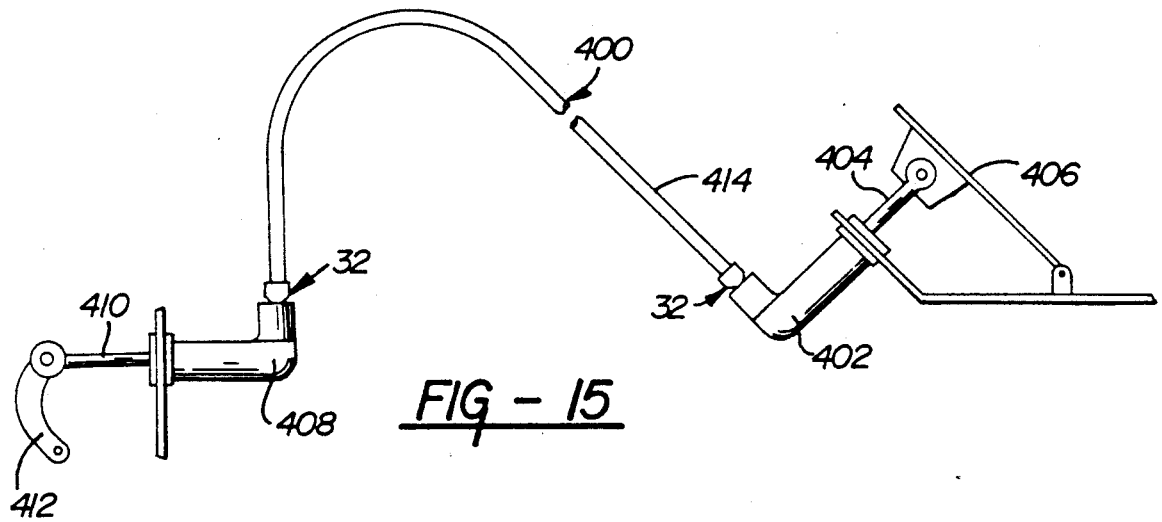
Figure 16:
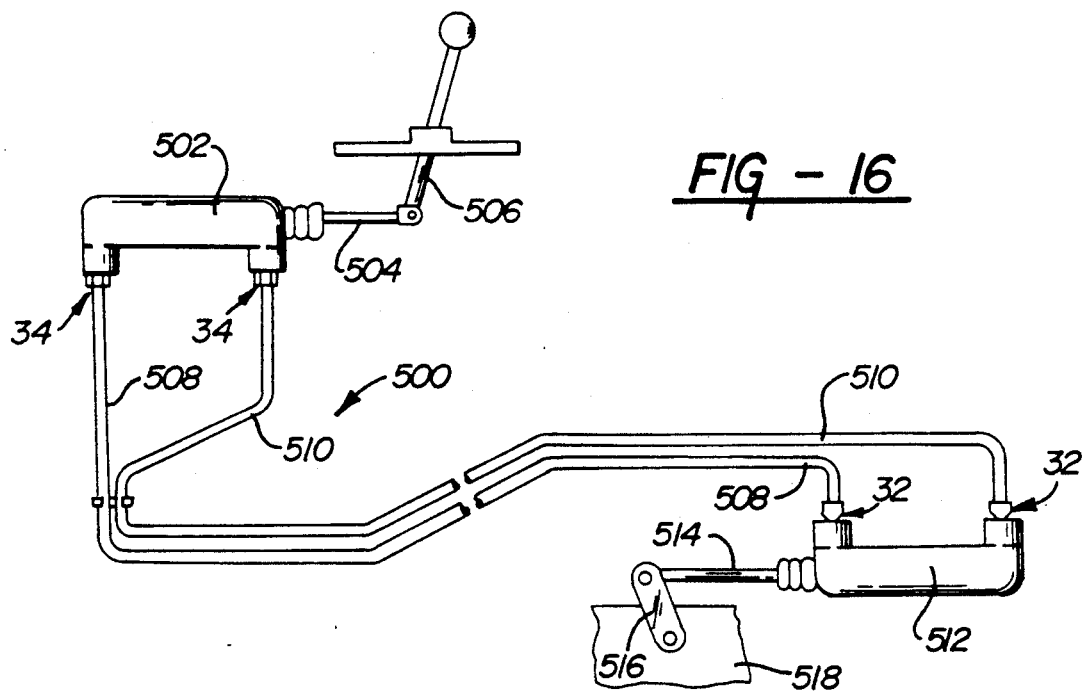

As illustrated at FIGS. 14-16, the present invention has many applications, more particularly in the automotive field. For example, as illustrated at FIG. 14, the present invention permits to design a motor vehicle hydraulic brake system, as illustrated generally and schematically at 300, made of prefilled pretested modular units. For the sake of illustration, the motor vehicle hydraulic brake system 300 is shown as comprising a brake pedal actuated master cylinder 302, a pair of front wheel brake drums or disks 304 each actuated by an appropriate slave cylinder, not shown, and a pair of rear brake drums or disks 306 operated by slave cylinders, not shown. In the example of structure illustrated, the master cylinder 302 is connected by a conduit 308 via a T-connector 310 and separate conduits 312 to the slave cylinder of the front wheel drums or disks 304. A conventional connector 34 connects one end of the conduit 308 to an outlet of the master cylinder 302, while a conventional connector 34 connects the other end of the conduit 308 to the inlet of the T-connector 310. A leakproof quick-connect connector 32 connects the free end of each wheel conduit 312 to the T-connector 310. The master cylinder 302, together with the line 308 and the T-connector 310 form therefore a modular unit which may be individually filled with hydraulic fluid. Each slave cylinder operating the brake drum or disk of the front wheel 304 together with the corresponding wheel or conduit 310 form separate modular units which may be filled with hydraulic fluid individually and connected, on the motor vehicle assembly line, to the T-connector 310 by means of the leakproof quick-connect connector 32.

Similarly, the master cylinder 302 is connected through a conduit 314 to a T-connector 316 distributing hydraulic fluid through separate wheel conduits 318 to the slave cylinder operating the brake drums or disks of the rear wheel 306. In the example of structure illustrated, the conduit 314 is attached to a second outlet of the master cylinder 302 by means of a leakproof quick-connect connector 32, and the other end of the conduit 314 is connected to the inlet of the T-connector 316 by means of a conventional connector 34. The modular unit consisting of the line 314 and the T-connector 316 can thus be filled separately with hydraulic fluid as a single modular unit. Each wheel conduit 314 being connected to the T-connector 316 by means of a leakproof quick-connect connector 32, the assembly consisting of the rear wheel conduit 318 and the slave cylinder actuating the brake shoe or disk pad of the rear wheel drums or disks 306 may be filled separately with hydraulic fluid each as a modular unit which, on the assembly line, are connected into the hydraulic brake system 300 by means of the leakproof quick-connect connectors 32.

It will be appreciated, by those skilled in the art, that a hydraulic brake system, according to the example of structure of FIG. 14, or similar structures provided with prefilled and pretested separate modular units, allows extreme flexibility in installing a hydraulic brake system on a motor vehicle, on the assembly line, modular unit by modular unit, and to connect the whole brake hydraulic system, without requiring the necessity of assembling hydraulic brake systems on a motor vehicle and filling the systems after installation. Also, it permits to effectuate repairs by replacing modular units of a brake system, without the requirement of purging the whole system and refilling with hydraulic fluid after the repair or replacement of components has been effected.

FIG. 15 illustrates an example of motor vehicle throttle hydraulic control apparatus 400, as disclosed in copending application Ser. No. 555,668. Such a system comprises principally a master cylinder 402 whose input member or pushrod 404 is operated by an accelerator pedal 406, and a slave cylinder 408 having an output member 410 actuating an engine throttle lever 412, the master cylinder 402 being connected to the slave cylinder 408 by a flexible conduit 414. In the example of structure illustrated, the conduit 414 is connected at one end to the master cylinder 402 through a leakproof quick-connect connector 32, and is connected to the slave cylinder 408 at its other end also by means of a leakproof quick-connect connector 32.

Such a structure permits to fill with hydraulic fluid, and test individually, the master cylinder 402 as a single modular unit, the conduit 414 as a second modular unit and the slave cylinder 408 as a third modular unit, install the master cylinder 402 and the slave cylinder 408 on a motor vehicle, and connect them with the conduit 414 which may be routed as required through the motor vehicle engine compartment, and which may be routed over long distances as, for example, in installations in rear engine motor vehicle. It is evident that, if so desired, the conduit 414 may be connected to one of the cylinders by a conventional cheaper connector, and that the cylinder with the conduit 414 thus attached thereto forms a separate modular unit which may be individually filled with hydraulic fluid and tested.

FIG. 16 schematically illustrates another example of application of the invention to a hydraulic shift control for a motor vehicle, such as disclosed in detail in copending application Ser. No. 555,666. The hydraulic shifter, designated generally at 500, comprises a double acting master cylinder 502 having an input member or pushrod 504 reciprocable by a shift lever 506 under the control of the motor vehicle driver. The double acting master cylinder 502 is connected via two flexible conduits 508 and 510 to the double acting slave cylinder 512 having an output member 514 operating the shifter 516 on the transmission casing 518. The shifter system 500 is prefilled and pretested at the factory prior to shipping to the motor vehicle manufacturer and, if so desired to provide flexibility in the installation of the apparatus on a motor vehicle on the motor vehicle assembly line, is supplied in prefilled pretested modular units which, in the example of structure illustrated, consists of the master cylinder 502 provided with the conduits 508 and 510 attached thereto by means of conventional connectors 34, the other end of the conduits 508 and 510 being provided with one-half of a leakproof quick-connect connector 32, the other half of which is made integral with the slave cylinder 512. The slave cylinder 512 may thus be filled separately with hydraulic fluid and tested such as to form a separate modular unit.

Figure 17:
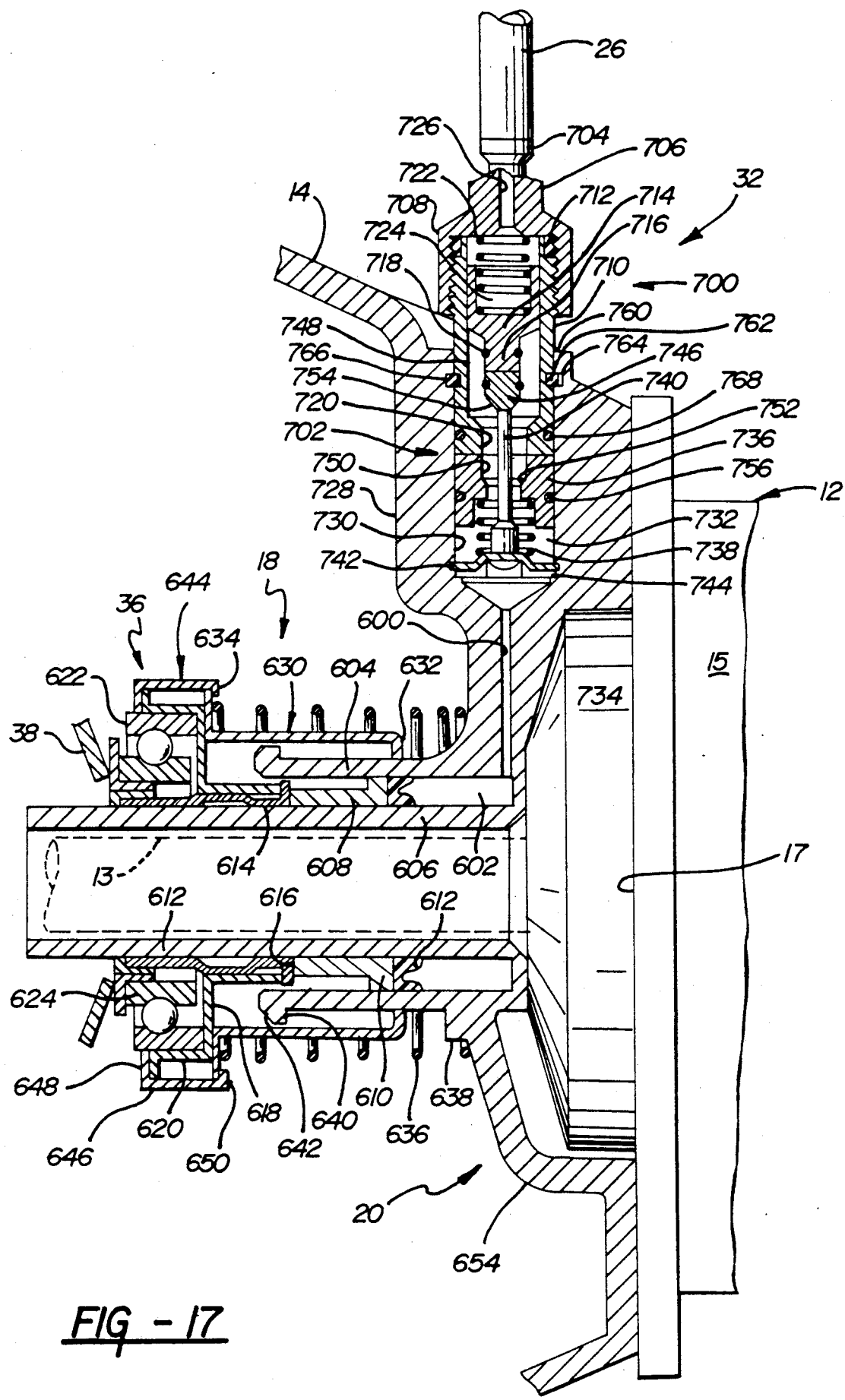

FIG. 17 illustrates details of a concentric slave cylinder 18 as well as details of a quick connect connector 32 for use with the slave cylinder 18. Slave cylinder 18 has its housing 20 cast integral with clutch bell housing 14 and is provided with a passageway 600 leading to an annular chamber 602 formed between two concentric tubular portion 604 and 606 cast integral with the clutch bell housing. An annual piston 608 is reciprocally and slidably disposed in the annual chamber 602 of the cylinder housing 20 between the two concentric tubular portion 604, 606, the piston 608 having a relatively thin cylindrical portion slidably fitting about the periphery of the inner tubular portion 606 and an integrally formed larger diameter head portion 610 slidably fitting between the concentric tubular portions 604 and 606. An elastomeric annular seal 612, V-shaped in section, is freely disposed in the annular chamber 602 above the annular head portion 610 of the piston 608 such as to prevent leakage of fluid from annular chamber 602 past piston 608.

A metallic sleeve or carrier 612 is slidably disposed around the periphery of the inner tubular portion 606 of the cylindrical housing 20. The carrier 612 has a flanged end portion 614 freely engaged with the end face 616 of the cylindrical portion 609 of the piston 608 and another flange portion 618 disposed at its other end having a bent-over rim 620 fixedly supporting the outer race 622 of the clutch throw-out bearing 36, the bearing outer race 622 being for example press-fitted within the carrier rim 620. The inner race 624 of the throw-out bearing is arranged to engage the end of the clutch release fingers 38 such that when the throw-out bearing is displaced outwardly the clutch is released.

The dust cover 630 is disposed surrounding a portion of the carrier 612 on a portion of the peripheral surface of the outer tubular portion 604 of the cylinder housing 20. The dust cover 630 is generally cylindrical in shape and is molded of plastic such as nylon. One end of the dust cover 630 is formed with an inwardly radially projecting flange or lip 632 having an inner edge in sliding engagement with the peripheral surface of the cylinder outer tubular portion 604. The other end of the dust cover has an outwardly projecting flange portion 634 abutting against the flange portion 618 of the carrier 612. A coil spring 636 is held in compression between the flange portion 612 of the carrier and an annular abutment 636 formed on a radially outwardly extending flange portion 640 of the cylinder housing 20, and thus tends to urge the flange 634 of the dust cover engaged with the flange portion 618 of the carrier with the result that when the throw-out bearing is reciprocated, as a result of reciprocation of the piston 608, the dust cover reciprocates in unison with the throw-out bearing, the inner edge of the dust cover lip 632 remaining in engagement with the peripheral surface of the outer tubular portion of the slave cylinder housing 20.

The slave cylinder housing 20 has at least a pair of diametrically arranged outwardly projecting lugs 640 disposed at the end of the outer tubular portion of the slave cylinder housing 20, each lug 640 having an inclined leading edge forming a ramp 642. During assembly of the slave cylinder 18 the lugs are engaged below the dust cover by snapping the edge of the dust cover lip 632 over the outwardly projecting lugs 640, the lug ramp 642 facilitating the passage of the lip edge over the lugs.

A restraining strap, designated generally at 644, is provided for retracting the throw-out bearing, after assembly of the slave cylinder 18, against the action of the compressed coil spring 636. The restraining strap holds the throw-out bearing in a retracted position during filling of the hydraulic apparatus with hydraulic fluid, during shipment to a motor vehicle manufacturer, and during assembly of the hydraulic clutch release system of the invention on a motor vehicle on the assembly line.

The restraining strap 644 is preferably molded of plastic such as nylon and comprises an annual collar 646 provided with a pair of substantially parallel inwardly directed end flanges 648 and 650 fitting over respectively a flange formed on the end of the rim portion 620 of the carrier and the end of the flange of the dust cover. A pair of bands or strips 652 (FIG. 1) are integrally molded with and extend from the strap annular collar 646, the free end of each band or strip terminating with an integral strut, not shown, or other means for attaching the end of each band or strip to the slave cylinder housing 20 at the housing flange 654. Each band or strip of the restraining strap is provided with a weakened portion, which may be a portion of reduced thickness or a portion of reduced width, or both. After installation of the apparatus of the invention in the motor vehicle and upon first actuation of the slave cylinder 18, hydraulic fluid displaced from the master cylinder 28 to the annual chamber 602 in the slave cylinder housing 20 causes displacement of the seal 612 and piston 608 and displacement of the throw-out bearing as a result of the coupling between the piston and the throw-out bearing through the carrier with the result that the bands or strips 652 are broken at their weakened portion, thus releasing the throw-out bearing for normal operation by the slave cylinder 18.

A leak proof quick connect connector 32 is provided to connect conduit 26 from the master cylinder 28 to the slave cylinder 18. Connector of 32 is formed of two complementary half connectors or members 700 and 702 generally corresponding to the complementary members 44 and 46 previously described.

The half connector 700, or male member in the example of structure illustrated, is mounted on the end of the flexible conduit 26 by having an appropriate tubular fitting 704 having a reduced diameter portion, not shown, projecting within the flexible conduit 26, an appropriate clamp, not shown, ensuring a leak proof mechanical connection between the end of the flexible conduit 26 and fitting 704.

The tubular fitting 704 is formed integral with an end cap 706 having a rim 708 into which is threadably fastened, crimped or welded a tubular body member 710, an appropriate gasket 712 insuring leak proof connection between the two elements in threaded or crimped structures. A valve spool 714 having a cylindrical reduced end portion 716 provided with a groove in which is disposed an "O" ring 718 is slideably disposed in the tubular body member 710. The tubular body member 710 has a restricted diameter portion or orifice 720 at its open end such that the spool valve 714, urged by a coil spring 722 disposed therebehind, tends to be displaced downwardly, the interior space or chamber 724 within tubular body member 710 being closed at its open end by the "O" ring provided reduced diameter portion of the valve spool engaged in the orifice 720. The chamber 724 within the tubular body member is, at its other end, continuously placed in communication through a passageway 726 disposed in the end cap 706 with the interior of the flexible conduit 26. Two opposite sides of the valve spool 714 are cut out such that the body of the valve spool does not prevent flow of fluid into or from the chamber 724, the valve spool reduced end portion 714 only being effective to close the end of the chamber 724 when urged within the restricted diameter portion or orifice 720 of the tubular body member 710.

The connector second half 702, or female member in the example illustrated, takes the form of a housing 728 which may conveniently be cast integral with the clutch bell housing 14 and the housing 20 of the slave cylinder 18 as shown, or in the alternative, may take the form of a cylindrical housing fastened to the unitary casting of the clutch bell housing 14 and the slave cylinder housing 20. A bore 730 in the housing 728 defines a chamber 732 having an end 734 placed in communication with passageway 600 leading into the slave cylinder annual chamber 602. An annual sleeve 736 is slideably disposed within the bore 730 and is normally urged toward the open end of the bore of 730 by a coil spring 738. A rod 740 attached to the bottom of the bore 730 by means of an appropriate generally U-shape bracket 742, held in position by an expandable split ring 744 disposed in a appropriate groove in the surface of the bore 730, is provided at its other end with an enlarged head portion 746 having a peripheral groove in which is disposed an O-ring 748. The O-ring provided on enlarged head portion 746 of the rod 740 fits within the bore or orifice 750 of the annular sleeve 736 and the bore 750 of the annular sleeve 736 has a reduced diameter portion forming an annular abutment 752 for engagement with a corresponding annular surface 754 on the interior end face of the rod enlarged head portion 746, such as to effectively limit the outward displacement of the annular sleeve 736. The peripheral surface of the annular sleeve 736 is provided with a groove in which is disposed a compressed O-ring 756.

It will be apparent that, with halves 700 and 702 separated or uncoupled, port 720 of the male member is sealed by O-ring 718 and port 750 of the female member is sealed by O-ring 748, whereas when male half connector 700 is introduced into female connector 702, the end face of the valve spool end portion 716 engages the end face of the rod enlarged head portion 746, thus causing the spool valve 714 to retract within the tubular member 710 against the action of the spring 722 combined with the simultaneous retraction of the annular sleeve 736, while compressing the spring 738, as a result of the end face of the annular sleeve 736 being pushed by engagement with the end face of the tubular member 710, the internal chambers of the two half connectors thus being opened to one another, thus permitting direct fluid communication between the annular chamber 602 of the slave cylinder 18 and the interior of the master cylinder 28 through the flexible conduit 26.

The half connector tubular housing 728 is provided at its open end with an internal tapering and converging surface, or frusto conical surface 760, which during introduction of the tubular body member 710 within the bore 730, causes an elastically compressible split spring ring 762 positioned in an external groove 764 in body member 710 to progressively collapse within the groove to conform to the internal diameter of the bore 730, while the end face of the tubular member 710 progressively displaces the annular sleeve 716 in the bore 710. The bore 730 is provided with a groove 766 allowing the elastically compressible and expandable ring 762 to extend when reaching the level connector 700 in the bore 730 of the half connector 702. To prevent leakage past the connector, the tubular member 710 of the half connector 700 has a peripheral groove proximate its end in which is disposed an O-ring 768.

Having thus described the present invention by way of examples of structure well designed for achieving the objects of the invention, modifications whereof will be apparent to those skilled in the art, what is claimed as new is as follows:

1. A hydraulic apparatus comprising a master cylinder, a slave cylinder, a conduit placing said master cylinder in fluid communication with said slave cylinder, and a quick-connect leakproof connector mounted at a predetermined location between said master cylinder and said slave cylinder, said connector comprising two interengageable complementary members each having a port providing fluid communication between said members when said members are coupled together and each having means closing the respective port when said members are uncoupled, said apparatus comprising at least two separate modular units each evacuated of air and filled with hydraulic fluid and having one of said connector complementary members mounted at an end thereof, said complementary members having coacting means operative in response to coupling of said members to provide one way interlocking means inhibiting uncoupling of said members, said modular units being evacuated of air and prefilled with hydraulic fluid, installed separately in a utilization device, and connected by lockingly coupling said connector complementary members together.

2. The hydraulic apparatus of claim 1 wherein said quick-connect leakproof connector is mounted such as to connect said master cylinder to an end of said conduit.

3. The hydraulic apparatus of claim 1 wherein said quick-connect leakproof connector is mounted such as to connect said slave cylinder to an end of said conduit.

4. The hydraulic apparatus of claim 1 wherein a first quick-connect leakproof connector is mounted such as to connect an end of said conduit to said master cylinder and a second quick-connect leakproof connector is mounted such as to connect the other end of said conduit to said slave cylinder.

5. The hydraulic apparatus of claim 1 wherein said quick-connect leakproof connector is mounted at a location between the ends of said conduit.

6. The hydraulic apparatus of claim 1 wherein said apparatus is a motor vehicle clutch control apparatus.

7. The hydraulic apparatus of claim 1 wherein said apparatus is a motor vehicle throttle control apparatus.

8. The hydraulic apparatus of claim 1 wherein said apparatus is a motor vehicle gear shifter apparatus.

9. A quick connect leakproof connector for interconnecting at least two separate modular units of a hydraulic control apparatus, said connector comprising a pair of separate members in the form of a male member and a complementary female member, said female member having a tubular body and a central bore in said tubular body and including an end wall closing one end of said tubular body to define a closed end and an open end for said female member bore, said male member having a tubular body and a central bore in its tubular body and including an end wall closing one end of its tubular body to define a closed end and an open end for said male member bore, said male member being adapted to be inserted axially into said female member bore, said male and female members having coacting means operative in response to insertion of said male member axially into said bore in said female member to lockingly engage said members to inhibit their disconnection, each of said members having normally closed valving means opened when said male member is inserted axially into said bore in said female member, said valving means including a cup-shaped spool member including an end wall and a tubular cylindrical side wall axially slidably disposed in said bore in said female member, circumferential sealing means between the inner periphery of said female member bore and the outer periphery of said cylindrical side wall of said spool member, a central port defined in said spool member end wall, a solid central stem extending axially in said female member bore, rigidly secured at one end thereof to said female member adjacent said female member end wall, and having a head at its other end sized to fit sealingly in said central port in said spool member end wall, spring biasing means disposed behind said spool member for urging said spool member to an extended position in which said port is closed by said head of said stem, a central port defined in the open end of said male member bore and defining a tip therearound, a spool member axially slidably disposed in said bore in said male member, spring biasing means urging said male member spool member in a direction closing said port at the tip of said male member, the tip of said male member when inserted into the bore of said female member being operative to engage and retract said female member spool member end wall to a position disengaging said head of said stem from said port in said end wall of said female member spool member, said head of said central stem being operative to retract said male member spool member from said port at the tip of said male member in response to insertion of said male member into said female member bore, a central fluid outlet passage in said female member end wall, means defining circumferentially spaced passages proximate said female end wall around said rigidly secured stem communicating said female member bore with said outlet passage, and a fluid central outlet passageway through said male member end wall communicating with said male member bore, whereby to place the bore in said female member and the bore in said male member respectively in communication with the modular units interconnected by said quick connect leakproof connector, said modular units being prefilled with hydraulic fluid, installed separately in a utilization device, and connected by lockingly coupling said connector complementary members together.

10. The connector of claim 9 wherein one of said connector complementary members is made integral with a hydraulic cylinder forming a part of the hydraulic control apparatus.

11. A hydraulic apparatus for controlling a utilization device, said apparatus including:
(A) a master cylinder having an outlet and an input member adapted to be connected to a control member of the utilization device;
(B) a slave cylinder having an inlet and an output member adapted to be connected to a controlled member of the utilization device;
(C) a conduit adapted to extend between said master cylinder outlet and said slave cylinder inlet; and
(D) a quick connect leakproof connector mounted at a predetermined location between said master cylinder outlet and said slave cylinder inlet to define a first modular unit including said master cylinder and a second modular unit including said slave cylinder assembly, each of said modular units being filled with hydraulic fluid prior to installation on the utilization device, said quick connector including two engageable members each associated with a respective modular unit, said members acting to hydraulically seal the respective modular units when not engaged and allowing the establishment of hydraulic fluid communication between said modular unit when engaged.

12. A hydraulic apparatus according to claim 11 wherein:
(E) one end of said conduit is connected to said master cylinder outlet and one of said quick connect members is fitted on the other end of said conduit; and
(F) the other of said quick connect members is mounted proximate said slave cylinder assembly inlet.

13. A hydraulic apparatus according to claim 12 wherein:
(G) said quick connect connector includes a male member and a female member; and
(H) said female member is mounted proximate said slave cylinder assembly inlet.

14. A hydraulic apparatus according to claim 11 wherein:
(E) said connector includes one-way interlocking means inhibiting disconnect of said members after said members have been coupled by the user.

15. A hydraulic apparatus according to claim 11 wherein the utilization device is a motor vehicle and wherein:
(E) said master cylinder input member is adapted to be connected to the clutch pedal of the motor vehicle; and
(F) said slave cylinder output member is adapted to be connected to the release bearing of the clutch of the motor vehicle.

16. A hydraulic apparatus according to claim 15 wherein:
(G) said slave cylinder is an annular slave cylinder including an annular housing adapted to be positioned within the vehicle clutch housing in concentric surrounding relation to the clutch shaft interconnecting the vehicle clutch and the vehicle transmission.

17. A hydraulic apparatus according to claim 16 wherein:
(H) said annular housing defines an annular bore; and
(I) said slave cylinder further includes an annular piston slidably mounted in said annular bore.

18. A hydraulic apparatus for controlling the engagement and disengagement of the clutch of a motor vehicle, said apparatus comprising:
(A) a master cylinder having an input rod adapted to be connected to the clutch pedal of the motor vehicle and having an outlet;
(B) an annular slave cylinder assembly adapted to be positioned within the vehicle clutch housing in concentric surrounding relation to the clutch drive shaft interconnecting the vehicle clutch and the vehicle transmission and including an annular housing defining an annular bore, and means defining a passage extending between said bore and a slave cylinder assembly inlet;
(C) a conduit adapted to extend between said master cylinder outlet and said slave cylinder assembly inlet; and
(D) a quick connect leakproof connector mounted at a predetermined location between said master cylinder outlet and said slave cylinder assembly inlet to define a first modular unit including said master cylinder and a second modular unit including said annular slave cylinder assembly, said quick connector including two engageable members each associated with a respective modular unit, said members acting to seal the respective modular units when not engaged and allowing the establishment of fluid communication between said modular units when engaged, said first and second modular units being prefilled with hydraulic fluid and delivered to a motor vehicle assembly site with said quick connect members respectively sealing the modular units so that said annular slave cylinder assembly may be installed in the clutch assembly of the vehicle in surrounding relation to the clutch drive shaft and in operative relation to the throw-out bearing of the clutch, said master cylinder may be mounted on the vehicle body proximate the vehicle clutch pedal, said master cylinder input rod may be connected to the vehicle clutch pedal, and said quick connector members may be engaged so that depression of the vehicle clutch pedal disengages the vehicle clutch.

19. A hydraulic apparatus according to claim 18 wherein:
(E) said connector includes one-way interlocking means inhibiting disconnect of said members after said members have been coupled by the user, whereby said modular units may be prefilled, installed separately in the vehicle, and lockingly engaged by connecting said connector members together.

20. A hydraulic apparatus according to claim 18 wherein:
(E) one end of said conduit is connected to said master cylinder outlet and one of said quick connect members is fitted on the other end of said conduit; and
(F) the other of said quick connect members is mounted proximate said slave cylinder assembly inlet.

21. A hydraulic apparatus according to claim 20 wherein:

(G) said quick connect connector includes a male member and a female member; and
(H) said female member is mounted proximate said slave cylinder assembly inlet.

22. A hydraulic apparatus according to claim 20 wherein:
(G) said slave cylinder assembly inlet is defined proximate the exterior of said annular slave cylinder housing; and
(H) said passage is defined at least in part in said annular slave cylinder housing and extends between said bore and said slave cylinder inlet.

23. A hydraulic apparatus according to claim 22 wherein:
(I) said annular slave cylinder housing includes an annular main body portion defining said annular bore and a radial portion extending radially outwardly from said main body portion;
(J) said passage is defined at least in part by a radially extending passageway in said radial portion; and
(K) said other quick connect member communicates with the radially outer end of said radially extending passageway.

24. A hydraulic apparatus according to claim 23 wherein:
(L) said quick connect connector includes a male member and a female member; and
(M) said female member communicates with the outer end of said radially extending passageway.

25. A hydraulic control apparatus for installation in a vehicle or machine, said apparatus when installed comprising a hydraulic master cylinder, a remote hydraulic slave cylinder and a conduit connecting the master cylinder to the slave cylinder, characterized in that the master cylinder, slave cylinder and conduit are filled with hydraulic fluid prior to installation in the vehicle or machine and in that a connector is provided through which hydraulic fluid can pass, said connector being of a leakproof quick connect type and comprising a pair of connector members each including valve arrangements which valve arrangements are both closed when the connector members are not coupled and are both open when the connector members are coupled to enable the cylinders to be interconnected through the conduit.

26. Apparatus according to claim 25 characterized in that the connector members are provided with one-way locking means which inhibit disconnection of said members after the members have been interconnected.

27. A hydraulic apparatus for installation on a machine, said apparatus comprising a master cylinder, a remote slave cylinder and a conduit connecting said master cylinder to said slave cylinder, said master cylinder, said slave cylinder and said conduit being supplied in the form of at least two separate modular units each capable of being coupled to the other by a leakproof connector having two interengageable complementary members having each a port for providing fluid communication between said members when coupled together by the user and means closing said ports when not coupled together, each modular unit being filled with hydraulic fluid prior to installation on the machine and each being provided with a respective one of said complementary members.

28. A hydraulic apparatus according to claim 27 wherein said connector includes one-way interlocking means inhibiting disconnect of said members after said members have been coupled together by the user.

29. A hydraulic apparatus according to claim 28 and further comprising unlocking means for disabling said interlocking means and allowing said member to be uncoupled.

30. A hydraulic apparatus for installation on a machine, said apparatus being formed by providing a hydraulic cylinder having a bore and piston means disposed in said bore, providing a conduit communicating at one end thereof with said bore, filling said bore and said conduit with hydraulic fluid prior to installation on the machine, and providing a coupling member on the other end of said conduit operative to normally close said other end of said conduit to prevent the passage of hydraulic fluid out of said other end of said conduit and operative in response to engagement with a complementary coupling member to open the other end of said conduit to allow the passage of hydraulic fluid through the other end of said conduit.

31. A hydraulic apparatus for controlling a utilization device, said apparatus including:
   (A) a hydraulic cylinder defining a bore;
   (B) piston means in said bore;
   (C) means defining a conduit opening at one end in said bore; and
   hydraulic fluid filling said bore and said conduit; and
   (D) a quick connect coupler member on the other end of said conduit operative to normally close said other end of said conduit to prevent the passage of hydraulic fluid out of the other end of said conduit and operative in response to engagement with a complementary quick connect coupler member to open the other end of said conduit to allow the passage of hydraulic fluid through the other end of said conduit;
   (E) said bore and said conduit being filled with hydraulic fluid prior to installation of said apparatus in the utilization device.

32. A hydraulic apparatus according to claim 31 wherein:
   (F) said cylinder comprises a master cylinder including an input member connected to said piston means and an outlet at said one end of said conduit; and
   (G) said apparatus further includes an expansible seal in contact with said hydraulic fluid.

33. A hydraulic apparatus according to claim 32 wherein:
   (H) said apparatus further includes a reservoir in fluid communication with said master cylinder bore; and
   (I) said expansible seal comprises an impermeable movable barrier positioned within said reservoir.

34. A hydraulic apparatus according to claim 33 wherein:
   (J) said reservoir includes a main body portion having an open top and a reservoir lid closing said open top and having a vent port; and
   (K) said impermeable movable barrier is positioned within said reservoir main body portion beneath said lid with one side thereof in contact with said fluid and the other side thereof in contact with the ambient by virtue of said vent port.

35. Hydraulic apparatus according to claim 33 wherein:
   (J) said reservoir main body is formed integrally with said master cylinder.

36. A hydraulic apparatus according to claim 31 wherein:
   (F) said cylinder comprises a slave cylinder.

37. A hydraulic apparatus according to claim 36 wherein:
   (G) said slave cylinder comprises a concentric slave cylinder including an annular housing;
   (H) said bore is annular; and
   (I) said conduit opens at said one end thereof in said annular bore.

38. A hydraulic apparatus according to claim 37 wherein:
   (J) said conduit is defined at least in part by a passage in said housing and said quick connect member communicates with said passage.

39. A hydraulic apparatus for installation on a utilization device, said apparatus comprising:
   (A) a hydraulic cylinder defining a cylindrical bore;
   (B) piston means in said bore;
   (C) means defining a conduit opening at one end in said bore;
   (D) a reservoir communicating with said bore;
   (E) an expensible seal in said reservoir; and (F) a quick connect coupler on the other end of said conduit operative to normally close said other end of said conduit to prevent the passage of hydraulic fluid out of the other end of said conduit and operative in response to engagement with a complementary quick connect coupler member to open the other end of said conduit to allow the passage of hydraulic fluid through the other end of said conduit, said apparatus being filled with hydraulic fluid prior to installation on the utilization device.

40. A hydraulic apparatus according to claim 39 wherein:
   (G) said reservoir includes a reservoir lid including a vent port; and
   (H) said expansible seal is positioned within said reservoir beneath said lid with one side thereof in contact with said fluid and the other side thereof in contact with the ambient by virtue of said vent port.

41. A hydraulic apparatus according to claim 40 wherein said apparatus further includes:
   (I) hydraulic fluid filling said bore, said conduit and said reservoir beneath said expansible seal.

42. A hydraulic apparatus for installation on a utilization device, said apparatus comprising:
   (A) a concentric slave cylinder including an annular housing defining an annular bore;
   (B) means defining a conduit opening at one end in said bore; and
   (C) a quick connect coupler member mounted on the other end of said conduit and operative to normally close said other end of said conduit and operative in response to engagement with a complementary quick connect coupler member to open the other end of said conduit, said apparatus being filled with hydraulic fluid prior to installation on the utilization device.

43. A hydraulic apparatus according to claim 42 wherein:
   (D) said conduit is defined at least in part by a passage in said housing; and
   (E) said quick connect coupler member communicates with said passage.

44. A hydraulic apparatus comprising a master cylinder, a slave cylinder, a conduit placing said master cylinder in fluid communication with said slave cylinder and a quick connect leakproof connector mounted at a predetermined location between said master cylinder and said slave cylinder, said connector comprising two interengageable complementary members each having a port providing fluid communication between said members when said members are coupled together and each having means closing the respective port when said members are uncoupled, said apparatus comprising at least two separate modular units each evacuated of air and filled with hydraulic fluid and having one of said connector complementary members mounted at an end thereof, said complementary members having coacting means operative in response to coupling of said members to provide one way interlocking means inhibiting uncoupling of said members, said connector further comprising means allowing authorized disconnect of said one way interlocking means by way of a specially adapted uncoupling device, said modular units being evacuated of air and prefilled with hydraulic fluid, installed separately in a utilization device, coupled by lockingly coupling said connector complementary members together, and uncoupled in response to actuation of said uncoupling device.

45. A hydraulic apparatus comprising a master cylinder, a slave cylinder, a conduit placing said master cylinder in fluid communication with said slave cylinder, and a quick connect leakproof connector mounted such as to connect said master cylinder to an end of said conduit, said connector comprising two interengageable complementary members each having a port providing fluid communication between said members when said members are coupled together and each having means closing the respective port when said members are uncoupled, said apparatus comprising at least two separate modular units each evacuated of air and filled with hydraulic fluid and having one of said connector complementary members mounted at an end thereof, said complementary members having coacting means operative in response to coupling of said members to provide one way interlocking means inhibiting uncoupling of said members, said connector further comprising means allowing authorized disconnect of said one way interlocking means by way of a specially adapted uncoupling device, said modular units being evacuated of air and prefilled with hydraulic fluid, installed separately in a utilization device, coupled by lockingly coupling said connector complementary members together, and uncoupled in response to actuation of said uncoupling device.

46. A hydraulic apparatus comprising a master cylinder, a slave cylinder, a conduit placing said master cylinder in fluid communication with said slave cylinder, and a quick connect leakproof connector mounted such as to connect said slave cylinder to an end of said conduit, said connector comprising two interengageable complementary members each having a port providing fluid communication between said members when said members are coupled together and each having means closing the respective port when said members are uncoupled, said apparatus comprising at least two separate modular units each evacuated of air and filled with hydraulic fluid and having one of said connector complementary members mounted at an end thereof, said complementary members having coacting means operative in response to coupling of said members to provide one way interlocking means inhibiting uncoupling of said members, said connector further comprising means allowing authorized disconnect of said one way interlocking means by way of a specially adapted uncoupling device, said modular units being evacuated of air and prefilled with hydraulic fluid, installed separately in a utilization device, coupled by lockingly coupling said connector complementary members together, and uncoupled in response to actuation of said uncoupling device.

47. A hydraulic apparatus comprising a master cylinder, a slave cylinder, a conduit placing said master cylinder in fluid communication with said slave cylinder, a first quick connect leakproof connector mounted such as to connect an end of said conduit to said master cylinder, and a second quick connect leakproof connector mounted such as to connect the other end of said conduit to said slave cylinder, each said connector comprising two interengageable complementary members each having a port providing fluid communication between said members when said members are coupled together and each having means closing the respective port when said members are uncoupled, said apparatus comprising at least two separate modular units each evacuated of air and filled with hydraulic fluid and having one of said connector complementary members mounted at an end thereof, said complementary members having coacting means operative in response to coupling of said members to provide one way interlocking means inhibiting uncoupling of said members, each said connector further comprising means allowing authorized disconnect of said one way interlocking means by way of a specially adapted uncoupling device, said modular units being evacuated of air and prefilled with hydraulic fluid, installed separately in a utilization device, coupled by lockingly coupling said connector complementary members together, and uncoupled in response to actuation of said uncoupling device.

48. A hydraulic apparatus comprising a master cylinder, a slave cylinder, a conduit placing said master cylinder in fluid communication with said slave cylinder, and a quick connect leakproof connector mounted at a location between the ends of said conduit, said connector comprising two interengageable complementary members each having a port providing fluid communication between said members when said members are coupled together and each having means closing the respective port when said members are uncoupled, said apparatus comprising at least two separate modular units each evacuated of air and filled with hydraulic fluid and having one of said connector complementary members mounted at an end thereof, said complementary members having coacting means operative in response to coupling of said members to provide one way interlocking means inhibiting uncoupling of said members, said connector further comprising means allowing authorized disconnect of said one way interlocking means by way of a specially adapted uncoupling device, said modular units being evacuated of air and prefilled with hydraulic fluid, installed separately in a utilization device, coupled by lockingly coupling said connector complementary members together, and uncoupled in response to actuation of said uncoupling device.

49. A quick connect leakproof connector for interconnecting at least two separate modular units of a hydraulic control apparatus, said modular units being filled with hydraulic fluid and said connector comprising a pair of separate members in the form of a male member and a complementary female member, said female member having a tubular body and a central bore in said tubular body and including an end wall closing one end of said tubular body to define a closed end and an open end for said female member bore, said male member having a tubular body and a central bore in its tubular body and including an end wall closing one end of its tubular body to define a closed end and an open end for said male member bore, said male member being adapted to be inserted axially into said female member bore, said male and female members having coacting means operative in response to insertion of said male member axially into said bore in said female member to lockingly engage said members to inhibit their disconnection, each of said members having normally closed valving means opened when said male member is inserted axially into said bore in said female member, said valving means including a cup-shaped spool member including an end wall and a tubular cylindrical side wall axially slidably disposed in said bore in said female member, circumferential sealing means between the inner periphery of said cylindrical side wall of said spool member, a central port defined in said spool member end wall, a solid central stem extending axially in said female member bore, rigidly secured at one end thereof to said female member adjacent said female member end wall, and having a head at its other end sized to fit sealingly in said central port in said spool member end wall, spring biasing means disposed behind said spool member for urging said spool member to an extended position in which said port is closed by said head of said stem, a central port defined in the open end of said male member bore and defining a tip therearound, a spool member axially slidably disposed in said bore in said male member, spring biasing means urging said male member spool member in a direction closing said port at the tip of said male member, the tip of said male member when inserted into the bore of said female member being operative to engage and retract said female member spool member end wall to a position disengaging said head of said stem from said port in said end wall of said female member spool member, said head of said central stem being operative to retract said male member spool member from said port at the tip of said male member in response to insertion of said male member into said female member bore, a central fluid outlet passage in said female member end wall, means defining circumferentially spaced passages proximate said female end wall around said rigidly secured stem communicating said female member bore with said outlet passage, and a fluid central outlet passageway through said male member end wall communicating with said male member bore, whereby to place the bore in said female member and the bore in said male member respectively in communication with the modular units interconnected by said quick connect leakproof connector, said coacting means comprising an internal groove in said female member and a retainer ring carried by said male member and disposable in said internal groove, a plurality of circumferentially spaced slots extending radially inwardly from the outer peripheral surface of said female member tubular body and opening at the radially inner ends in said internal groove in said female member bore, whereby said ring retainer disposed in said internal groove is adapted to be contracted by means passed through said slots for disconnecting said male member from said female member.

50. A hydraulic apparatus for installation on a utilization device, said apparatus comprising:
(A) a concentric slave cylinder including an annular housing defining an annular bore;
(B) an annular piston in said bore;
(C) means defining a conduit opening at one end in said bore; and
(D) a quick connect coupler member mounted on the other end of said conduit and operative to normally close said other end of said conduit and operative in response to engagement with a complementary quick connect coupler member to open the other end of said conduit;
(E) said bore and said conduit being filled with hydraulic fluid prior to installation of the apparatus on the utilization device.

* * * * *